United States Patent
Belliveau

(10) Patent No.: US 7,390,092 B2
(45) Date of Patent: Jun. 24, 2008

(54) IMAGE PROJECTION LIGHTING DEVICES WITH VISIBLE AND INFRARED IMAGING

(76) Inventor: Richard S. Belliveau, 10643 Floral Park, Austin, TX (US) 78759

(*) Notice: Subject to any disclaimer, the term of this patent is extended or adjusted under 35 U.S.C. 154(b) by 1012 days.

(21) Appl. No.: 10/290,660

(22) Filed: Nov. 8, 2002

(65) Prior Publication Data

US 2004/0090524 A1 May 13, 2004

(51) Int. Cl.
*G03B 21/26* (2006.01)
*G03B 21/14* (2006.01)
*G03B 21/22* (2006.01)
*G03B 11/01* (2006.01)
*G09G 5/00* (2006.01)

(52) U.S. Cl. ............................ 353/30; 353/84; 353/94; 353/119; 353/121; 353/122; 700/19; 348/744; 345/156

(58) Field of Classification Search ............... 353/30, 353/31, 84, 94, 33, 69, 70, 119, 121, 122; 700/19; 362/284; 359/291; 384/744; 345/4, 345/156, 173; 315/318
See application file for complete search history.

(56) References Cited

U.S. PATENT DOCUMENTS

| | | | | |
|---|---|---|---|---|
| 4,095,139 A | 6/1978 | Symonds et al. | ............ | 315/153 |
| 4,697,227 A | 9/1987 | Callahan | ............ | 362/233 |
| 4,857,997 A * | 8/1989 | Fukami et al. | ............ | 348/338 |
| 4,969,730 A * | 11/1990 | van den Brandt | ............ | 353/31 |
| 5,113,332 A | 5/1992 | Richardson | ............ | 362/282 |
| 5,801,771 A * | 9/1998 | Ohwaki et al. | ............ | 348/211.7 |
| 5,828,485 A | 10/1998 | Hewlett | ............ | 359/291 |
| 5,829,868 A | 11/1998 | Hutton | ............ | 362/276 |
| 5,988,817 A | 11/1999 | Mizushima et al. | ............ | 353/94 |
| 6,057,958 A | 5/2000 | Hunt | ............ | 359/291 |
| 6,099,128 A | 8/2000 | Jessl | ............ | 353/51 |
| 6,188,933 B1 * | 2/2001 | Hewlett et al. | ............ | 700/19 |
| 6,208,087 B1 | 3/2001 | Hughes et al. | ............ | 315/291 |
| 6,219,093 B1 | 4/2001 | Perry | ............ | 348/135 |
| 6,265,829 B1 * | 7/2001 | Perdec | ............ | 315/82 |
| 6,398,428 B1 * | 6/2002 | Szajewski et al. | ............ | 396/575 |
| 6,412,972 B1 | 7/2002 | Pujol et al. | ............ | 362/272 |
| 6,414,672 B2 * | 7/2002 | Rekimoto et al. | ............ | 345/173 |
| 6,588,944 B2 | 7/2003 | Harris | ............ | 385/88 |
| 6,597,410 B1 * | 7/2003 | Doany et al. | ............ | 348/744 |
| 6,671,005 B1 | 12/2003 | Pujol et al. | ............ | 348/771 |
| 6,757,008 B1 * | 6/2004 | Smith | ............ | 348/143 |
| 6,765,544 B1 | 7/2004 | Wynne Willson | ............ | 345/6 |
| 6,812,653 B2 * | 11/2004 | Bellivean | ............ | 315/318 |
| 2004/0102247 A1 * | 5/2004 | Smoot et al. | ............ | 463/36 |

(Continued)

OTHER PUBLICATIONS

Website: http://www.tlt.co.jp/tlt/art/catalogue/av/avjr.htm.

(Continued)

*Primary Examiner*—Melissa Jan Koval
(74) *Attorney, Agent, or Firm*—Walter J. Tencza, Jr.

(57) ABSTRACT

A lighting system comprised of a central controller, a digital communications path, and a plurality of image projection lighting devices (IPLDs) is provided. The IPLDs contain cameras that can capture both visible light and infrared light. Address signals sent from the central controller first address a particular IPLD and then command signals sent from the central controller control an infrared blocking filter to be positioned in and out of a camera optical path of the particular addressed IPLD.

43 Claims, 9 Drawing Sheets

U.S. PATENT DOCUMENTS

2005/0219838 A1* 10/2005 Belliveau .................. 362/120
2005/0253971 A1* 11/2005 Kim ......................... 348/744

OTHER PUBLICATIONS

W00221832A2 Title: "Image Projection Apparatus," Inventor: Wynne Wilson, Peter.

High End Systems Lighting World Wide, High End Systems Product Line 1997 (Lightwave Research®) www.highend.com copyright 1997, printed Sep. 2, 1999.

Website: http://www.tlt.co.jp/tlt/art/catalogue/av/avjr.htm, Aug. 10, 2005.

* cited by examiner

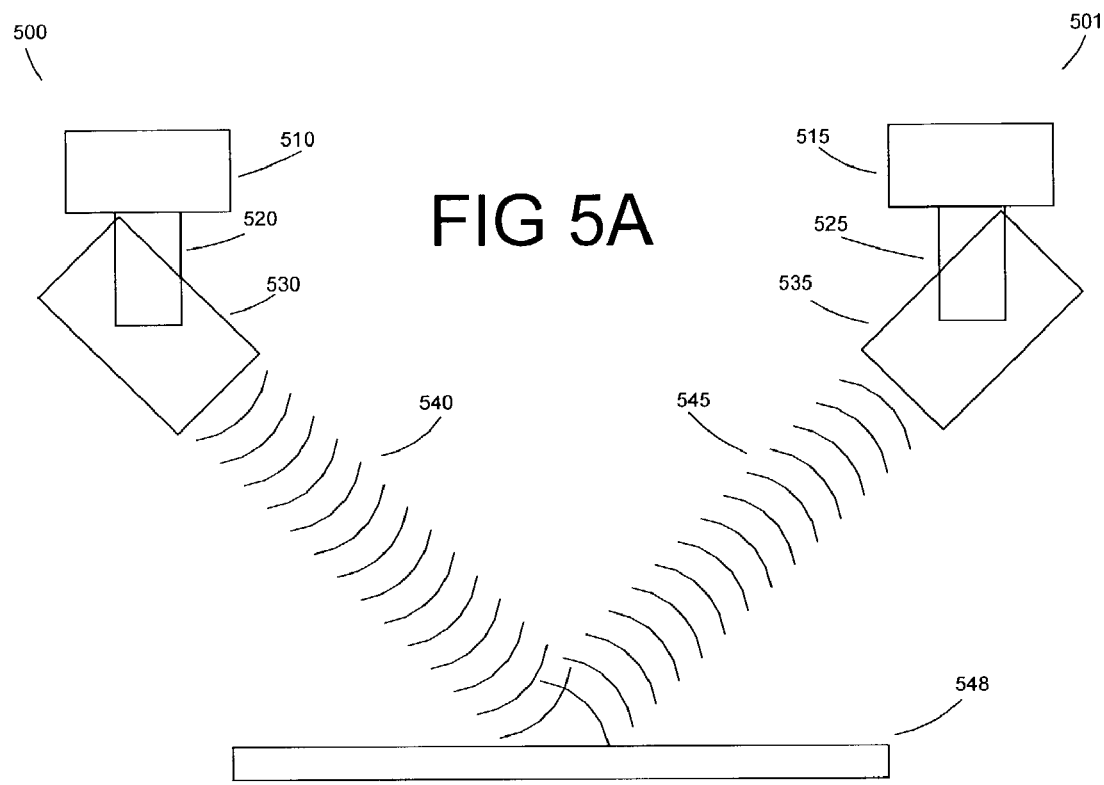
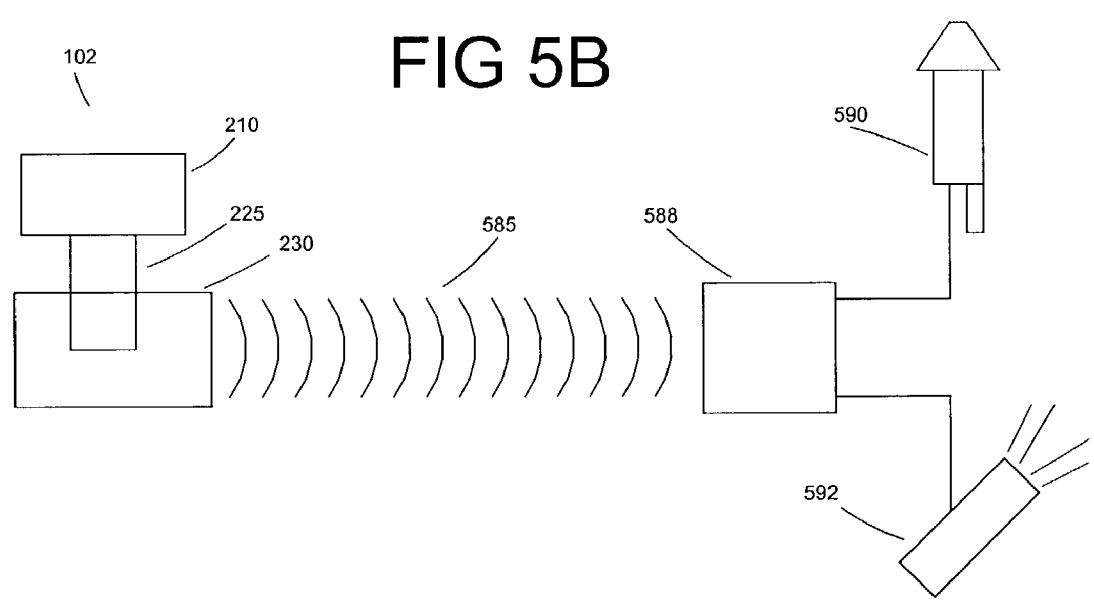

IMAGE PROJECTION LIGHTING DEVICES WITH VISIBLE AND INFRARED IMAGING

FIELD OF THE INVENTION

The present invention relates to lighting systems that are digitally controlled and to the light fixtures used therein, and more particularly to such lighting systems as well as to multiparameter lights that have an image projection lighting parameter and a camera and that are useful in such lighting systems.

BACKGROUND OF THE INVENTION

Lighting systems are formed typically by interconnecting many light fixtures by a communications system and providing for operator control from a central controller. Such lighting systems may contain multiparameter light fixtures, which illustratively are light fixtures having two or more individually remotely adjustable parameters such as beam size, color, shape, angle, and other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

Prior to the advent of relatively small commercial digital computers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger, which are incorporated by reference herein. With the widespread use of computers, digital serial communications over wire was widely adopted as a way to achieve remote control; see, e.g., U.S. Pat. No. 4,095,139, issued Jun. 13, 1978 to Symonds et al., and U.S. Pat. No. 4,697,227, issued Sep. 29, 1987 to Callahan, incorporated by reference herein. In 1986, the United States Institute of Theatre Technology ("USITT") developed a digital communications system protocol for multi-parameter light fixtures known as DMX512. Basically, the DMX512 protocol is comprised of a stream of data which is communicated one-way from the control device to the light fixture using an Electronics Industry Association ("EIA") standard for multipoint communications know as RS-485.

A variety of different types of multiparameter light fixtures are available. One type of advanced multiparameter light fixture which is referred to herein as an image projection lighting device ("IPLD") uses a light valve to project images onto a stage or other projection surface. A light valve, which is also known as an image gate, is a device for example such as a digital micro-mirror ("DMD") or a liquid crystal display ("LCD") that forms the image that is projected. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

U.S. Pat. No. 5,828,485, issued Oct. 27, 1998 to Hewlett, incorporated herein by reference, discloses the use of a camera with a digital micro mirror equipped light fixture for the purpose of following the shape of the performer and illuminating the performer using a shape that adaptively follows the performer's image. A camera capturing the image (such as a digital camera, which captures an image at least in part by storing digital data in computer memory, the digital data which defining or describing the image) preferably is located at the lamp illuminating the scene in order to avoid parallax. The image can be manually investigated at each lamp or downloaded to some central processor for this purpose.

United States patent application titled "METHOD, APPARATUS AND SYSTEM FOR IMAGE PROJECTION LIGHTING", inventor Richard S. Belliveau, publication no. 20020093296, Ser. No. 10/090926, filed on Mar. 4, 2002, incorporated by reference herein, describes prior art IPLDs with cameras and communication systems that allow camera content, such as in the form of digital data, to be transferred between prior art IPLDs.

IPLDs of the prior art use light from the main projection lamp that is sent though a light valve and focused by an output lens to project images on a stage. The light cast upon the stage by the IPLD is then imaged by the camera. U.S. Pat. No. 6,219,093 to Perry titled "Method and device for creating the facsimile of an image", incorporated herein by reference describes a camera that may be an infrared camera for use with a described lighting device that uses liquid crystal light valves to project an image. "Accordingly the camera and light are mounted together for articulation about x, y, and z axes as is illustrated in FIG. 1" (Perry, U.S. Pat. No. 6,219,093, col. 4, line 59).

The prior art patent to Perry, U.S. Pat. No. 6,219,093 makes use of a camera to distinguish objects in the camera's field from other objects. The distinguished object as imaged by the camera is then illuminated by the projected light passing through the light valves so as to only illuminate the distinguished object. The objects may be provided with an infrared emitter or reflector which interacts with a receiver or camera. Perry relies on the light produced from the projection lamp and the light valves to provide the illumination to the scene where the camera images or separate emitters or reflectors are provided with the objects on the stage. The Perry prior art patent describes its invention as a camera/light unit.

For IPLDs having a main projection lamp, a camera, and a light valve it would be desirable to superimpose an optical path of the camera with an optical path of the main projection lamp so that the two paths are coaxial. In this manner the images that are created by the main projection lamp and the light valve, that are projected onto the projection surface, and that are captured by the camera on the projection surface will be directly centered. There are several problems associated with superimposing the camera and the main projection lamp optical paths. One method involves using beam splitters as known in the optics art for superimposing two optical paths however beam splitters are known to produce a compromise where neither optical path will operate at its best efficiency. For example a 50% beam splitter could be used to provide 50% transmission of the light from the main projection lamp optical system towards the projection surface while allowing returning light from the projection surface to be reduced by 50% as it is captured by the camera. Various percentages can be managed such as 70% transmission of light from the main projection lamp optical system and 30% returning light to be captured by the camera as known in the optics art. The use of beam splitters for superimposing the camera optical path and the main projection lamp optical path requires unacceptable compromises.

Another method as known in the optics art is the pick off some of the light reflected from a projection surface towards the center of a main focusing lens. A small mirror can be located at the center of the main projection lens where light reflected from the projection surface can be directed at an angle towards the camera optical path by the small mirror while light projecting from the lens towards the projection surface is minimized only by the blockage of the small mirror. Depending on the size of the mirror used to pick off some of the light, the main projection lens is partially blocked resulting again in loss of efficiency of the main projection lamp optical system.

SUMMARY OF THE INVENTION

In one embodiment of the present invention a lighting system or apparatus which includes improved IPLDs is provided. The light system comprises a central controller, a digital communications path, and a plurality of improved image projection lighting devices (IPLDs) in accordance with the present invention. The IPLDs contain cameras as a component that can capture both visible light images and infrared light images. Being able to capture such images, means that the camera is sensitive to light images in the visible and the infrared range. Address signals sent from the central controller first address a particular IPLD and then command signals sent from the central controller control an infrared blocking filter to be positioned in and out of a camera optical path of the particular addressed IPLD. The infrared blocking filter when positioned in the camera optical path blocks infrared light or infrared images from being captured by the camera while only allowing visible light images to be captured by the camera. With the infrared blocking filter positioned out of the camera optical path the camera may receive both infrared light and visible light and can capture images in lower light conditions. An infrared blocking filter used to cut the sensitivity of the camera to infrared may be called an IR (infrared) cut filter.

A further embodiment of the present invention is a lighting system comprising a central controller, a digital communications path, and a plurality of improved image projection lighting devices (IPLDs) in accordance with the present invention. The IPLDs contain cameras as a component that can image both visible light and infrared light. Address signals sent from the central controller of the further embodiment first address a particular IPLD and then command signals sent from the central controller control a visible blocking filter to be positioned in or out of the camera optical path of the particular addressed IPLD. The visible blocking filter when positioned in the camera optical path blocks visible energy from being imaged by the camera while only allowing infrared light to be imaged by the camera sensor. With the visible blocking filter positioned out of the camera optical system the camera sensor is sensitive to visible light and infrared light. A visible blocking filter used to cut the sensitivity of the camera to visible light can be called VIS cut filter.

Yet another embodiment of the present invention is a lighting system comprising a central controller, a digital communications path, and a plurality of improved image projection lighting devices (IPLDs). The IPLDs contain a camera as a component and an additional light source or auxiliary light source for illumination of a projection surface. Address signals sent from the central controller of this embodiment first address a particular IPLD and then command signals sent from the central controller control an auxiliary light source that is additional to the light projected from the main projection lamp. The auxiliary light source may be controlled to be on or off and the width and frequency of the on and off times may be controlled by the command signals from the central controller.

The separate auxiliary light source of one or more embodiments of the present invention allows the ILPD camera to work with visible light as provided by the main projection lamp and IR light as provided by the auxiliary light source.

In contrast to the prior art, an improved IPLD in accordance with embodiments of the present invention can illuminate a stage with infrared light, capture images on the same stage with the infrared sensitive camera and project an image with visible light at the same time. It is also possible with an IPLD of one or more embodiments of the present invention to switch modes for the integrated camera as commanded by a central controller between the ability to image infrared light, visible light, or both.

The IPLD of one or more embodiments of the present invention may house two separate lamps or light sources. The first lamp or first light source (main projection lamp) is a light source used for directing light or a first light to a light valve used for the projection of visible light images upon a stage or another projection surface. The main projection light source may be a single lamp or a plurality of lamps used to direct light to the light valve or light valves. An image parameter is the parameter that controls the light valve or light valves. The image parameter is typically one of a plurality of parameters of the IPLD that are remotely controlled by a central controller. Using remote control of the image parameter from the central controller an operator may control the light valve to vary the images projected on the stage or projection surface by the IPLD. The light valve or valves can also be used to vary an intensity (brightness) parameter by controlling the amount of light available to be projected on the stage or projection surface. The second light source or auxiliary light source is typically an infrared (IR) illumination source for projecting infrared light or a second light on the stage so that the camera also contained by the IPLD can receive the images on the stage as illuminated by the infrared light source. In the preferred embodiment of the present invention, the second light source (referred to as the auxiliary light source) is comprised of a plurality of infrared light emitting diodes (IR LEDs). The auxiliary light source may also be an incandescent lamp, xenon lamp, mercury lamp, or a plurality of white light LEDs that can be filtered appropriately to only allow IR light to be transmitted. The auxiliary light source may be a single lamp or a plurality of lamps. The advantage of the IR LEDs is that they are instantly switched on and do not waste energy by producing other wavelengths of light that are not required.

IPLDs used in an entertainment lighting system can produce many colorful images upon the stage or projection surface. The term "image" is a general term that refers to a wide variety of image types which can be projected onto and typically can be seen on a projection surface, including continuous video images such as movies, graphic effects, and news programs, and still images such as pictures and clip art. One or more IPLDs on the same communications system may be supplied with one or more different channels of image content while at the same time being able to respond to commands, thereby giving the operator of the lighting system enormous creative control with regard to the image content projected by the various IPLDs in the system. The term "content" is a general term that refers to various types of creative works, including image-type works and audio works.

The images become part of the show and enhance the visual experience to the spectator. The present invention in one or more embodiments combines IPLDS previously known in the prior art with a camera that is integrated into an improved IPLD. The improved IPLD can capture the images of performers or the audience in near total darkness during a show with the integral camera. While the audience may not see the performer while the performer is singing a ballad in the darkness, images of the performer as received by the improved IPLDs of the present invention can be projected above or to the side of the performer. This creates an unusual and visually pleasing effect for the audience of the show. As the effect of viewing the performer in darkness by projecting IR images of the performer is used during the show, at some point it would be creative to gradually light the performer during the same ballad bringing the audiences attention back to the performer.

Another use or IR imaging systems and IR illumination systems for IPLDs is the use of imaging certain audience members.

In the prior art, multiparameter lights commonly scanned an audience with the projected visible light. The audience saw the light that was projected upon them.

With the improved IPLDs of the invention an invisible beam of IR light transmitted by an IPLD can be used to scan an audience or target an audience member. The audience member being unaware that invisible infrared light is cast upon them. The IPLD of one or more embodiments of the present invention projects the IR light from the contained auxiliary light source and captures images with the integral IR sensitive camera what the IR auxiliary light source is illuminating. The improved IPLD may not be projecting visible light from the main projection lamp or the improved IPLD may be also projecting visible light from the main projection lamp.

BRIEF DESCRIPTION OF THE DRAWINGS

FIG. 5A shows two image projection lighting devices similar to the image projection lighting devices in FIG. 1 along with a projection surface;

FIG. 5B shows a side view of an image projection lighting device and several external devices;

DETAILED DESCRIPTION OF THE DRAWINGS

Figure 1:
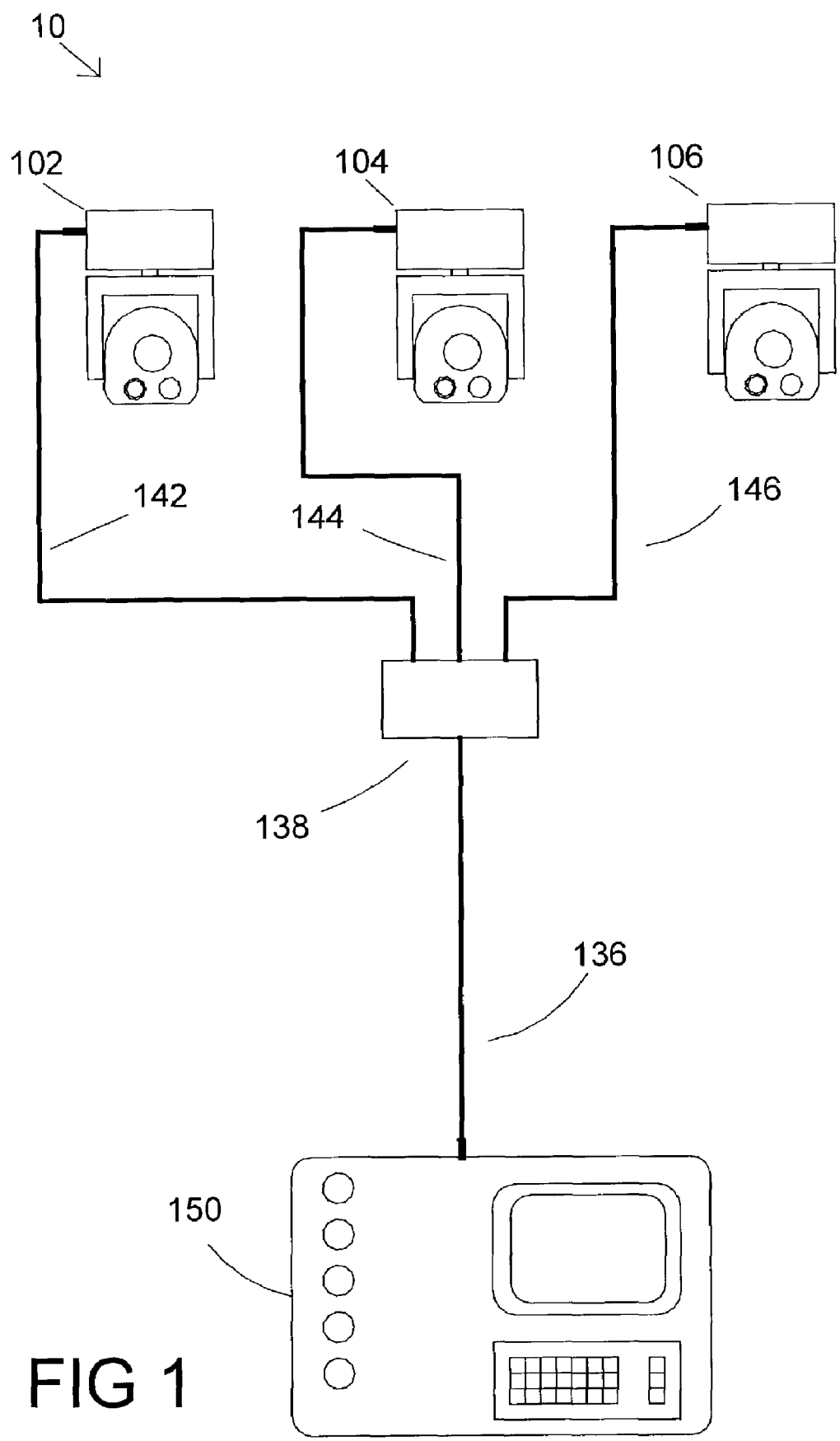
FIG. 1 shows an apparatus in accordance with a first embodiment of the present invention.

FIG. 1 shows an apparatus 10 comprised of a central controller 150, a communications interface 138, an IPLD (image projection lighting device) 102, an IPLD 104, and an IPLD 106. The IPLDs 102, 104, and 106 are electrically connected by communications lines 142,144, and 146, respectively, to the communication interface 138. The communications interface 138 is electrically connected to the central controller 150 by communications line 136. The central controller 150 may be a dedicated control console or a personal computer system.

Three IPLDs, 102,104, and 106 are shown for simplification, although many more IPLDs such as for example thirty IPLDS each one like any one of 102, 104, and 106 could be used in a lighting system or apparatus, such as apparatus 10. The communication interface 138 may be a router or hub as known in the communications art.

Figure 2:
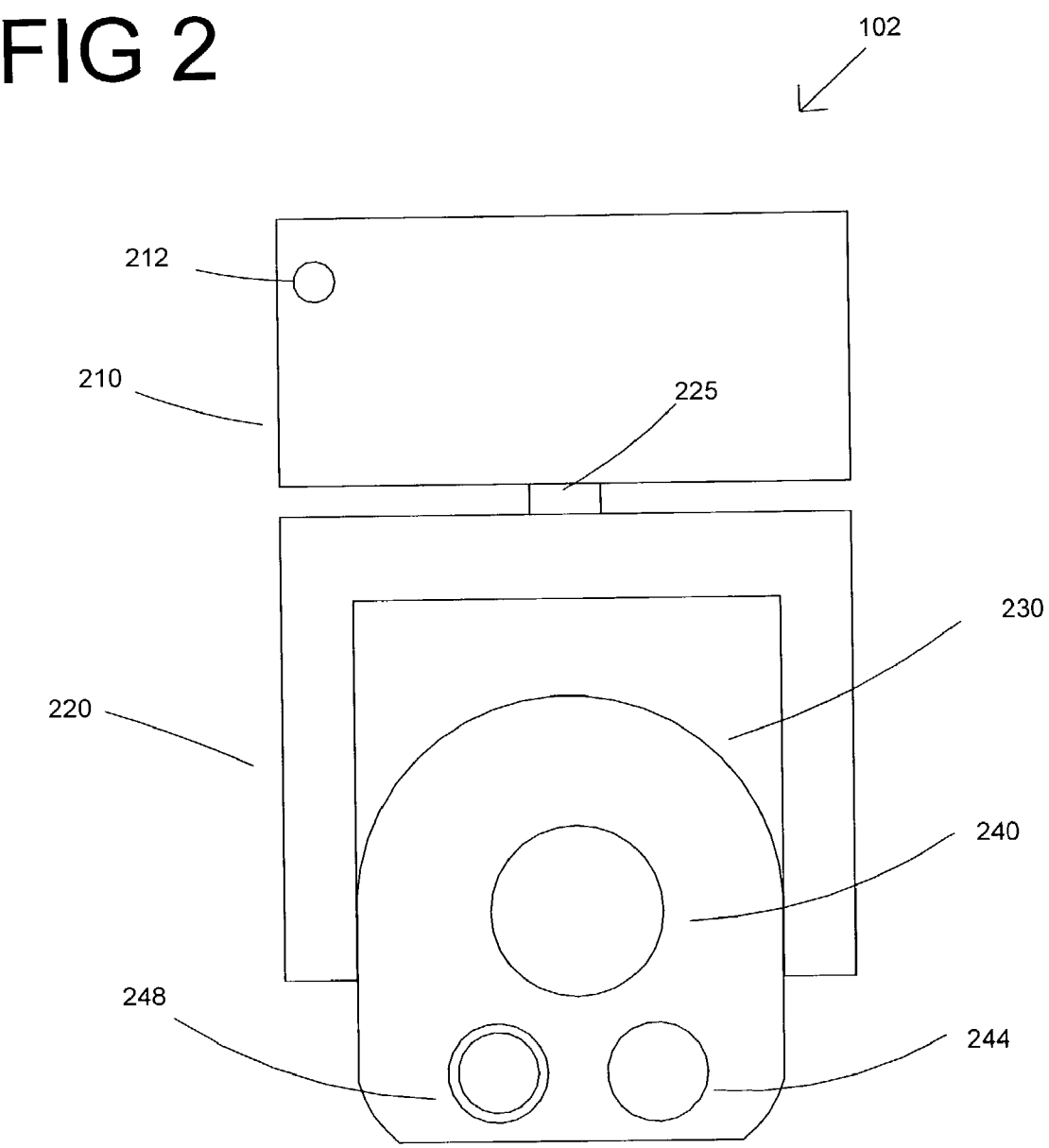
FIG. 2 shows a front view of an image projection lighting device for use with the embodiment of FIG. 1.

FIG. 2 shows a front view of the IPLD 102 of an embodiment of the present invention. The IPLD 102 includes a base or electronics housing 210, a yoke 220, and a lamp housing 230. The IPLDs 104 and 106 of FIG. 1 may each be identical to the IPLD 102 of FIG. 2.

The base housing 210 of the IPLD 102 includes a connection point 212 for electrically connecting a communications line, such as communications line 142 shown in FIG. 1. The yoke 220 is physically connected to the housing 210 by a bearing 225 which allows the yoke 220 to pan or rotate in relation to the electronics housing 210. The lamp housing 230 is rotatably connected to the yoke 220. The lamp housing 230 typically contains optical components. An exit aperture 240 is shown for projecting light from a main projection lamp inside the lamp housing 230. An aperture 248 is shown for allowing a camera 364 shown in FIG. 3, within the lamp housing 230 to receive and capture images. An aperture 244 is shown which allows light from an auxiliary light source, such as auxiliary light source 372 of FIG. 3, within the lamp housing 230, to be emitted out from the lamp housing 230.

Figure 3:
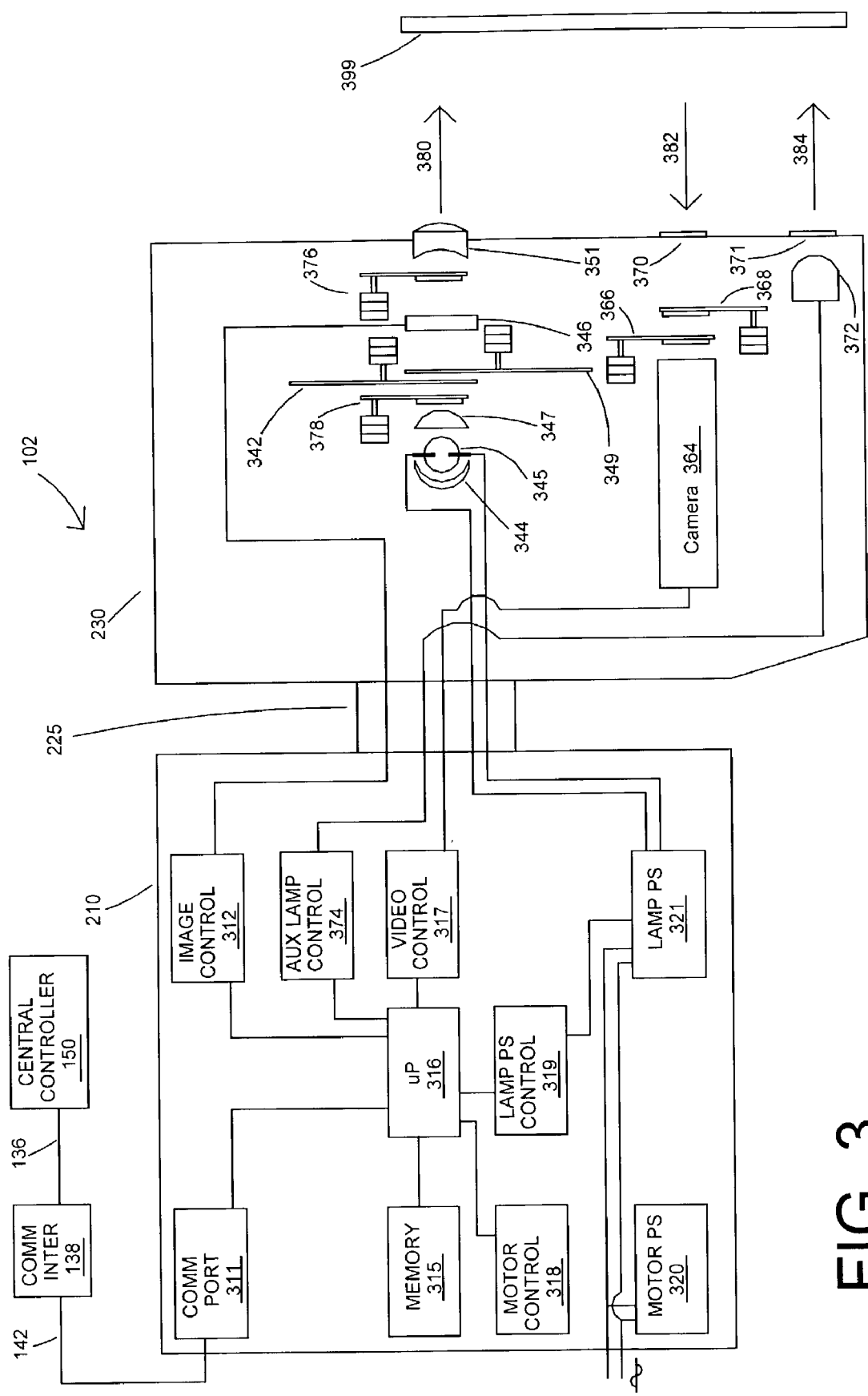
FIG. 3 is a block diagram showing components within a base housing and within a lamp housing of an image projection lighting device for use with the embodiment of FIG. 1.

FIG. 3 is a block diagram showing components within or part of the base housing 210 and within or part of the lamp housing 230 of the IPLD 102. FIG. 3 also shows the central controller 150.

The components within or part of the base housing 210 include a communication port (shown as "comm port") 311, image control 312, memory 315, microprocessor 316, video control 317, auxiliary lamp control 374, motor control 318, lamp power supply control 319, motor power supply 320 and lamp power supply 321.

The components within or part of the lamp housing 230 include a filter assembly 342, a mirror 344, a main projection lamp or main projection light source 345, a light valve 346, a condensing lens 347, a filter assembly 349, a focusing lens 351, a filter assembly 366, a filter assembly 368, an aperture 370, an aperture 371, auxiliary lamp or auxiliary light source 372, a filter assembly 376, and a filter assembly 378.

The central controller 150 outputs address and control commands over a communications system which may include communications interface 138 of FIG. 1. The communications interface 138 is connected to the communication port 311 by communications line 142 as shown in FIG. 3. The image control 312 of the electronics housing 210 provides control signals to the light valve 346 in the lamp housing 230. The microprocessor 316 in the electronics housing 210 provides control signals to the image control 312. The microprocessor 316 is shown electrically connected to the memory 315. The memory 315 stores the computer software operating system for the IPLD 102 and possibly different types of content used to form images at the light valve 346 of the lamp housing 230. The light valve shown as 346 is a transmissive type light valve where light from the projection lamp is directed to the light valve to be transmitted through the light valve to the lens. As known in the prior art a light valve can be a reflective light valve where light from the main projection lamp is directed to the light valve to be reflected from the light valve to the lens.

The motor control 318 is electrically connected to motors, the electrical connection to the motors is not shown for simplification. The motors may be stepping motors, servomotors, solenoids or any other type of actuators. The motor control 318 provides the driving signals to the motors used with filter assemblies 342, 349, 366, 368, 376, and 378. Filter assemblies 342 and 349 may be rotatable aperture wheels as known in the art. The aperture wheels, if used for filter assemblies 342 and 349, may be used to vary color or pattern parameters.

Figure 4A:
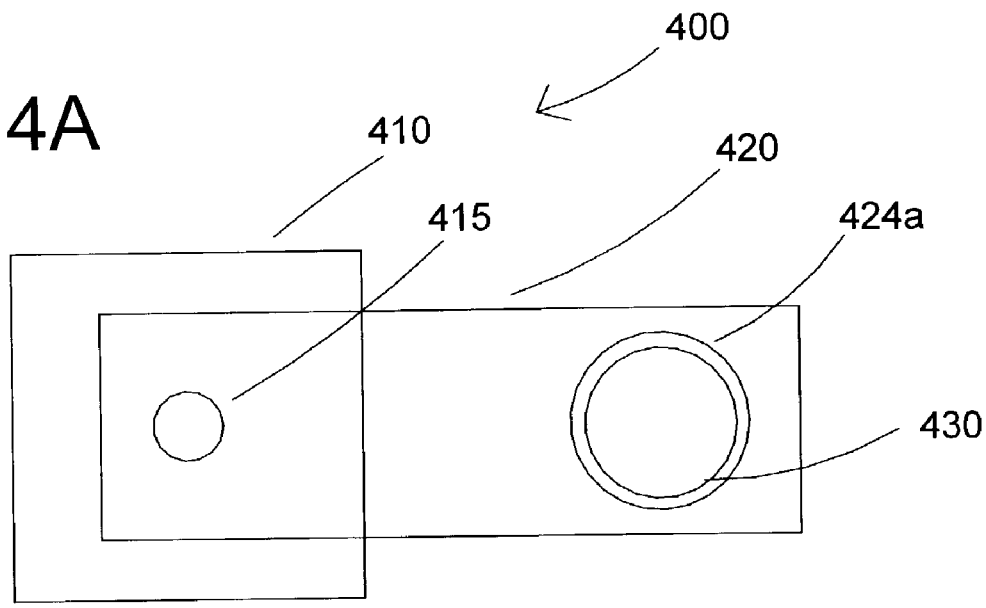
FIG. 4A shows a filter assembly in a first state, for use in embodiments of the present invention.
Figure 4B:
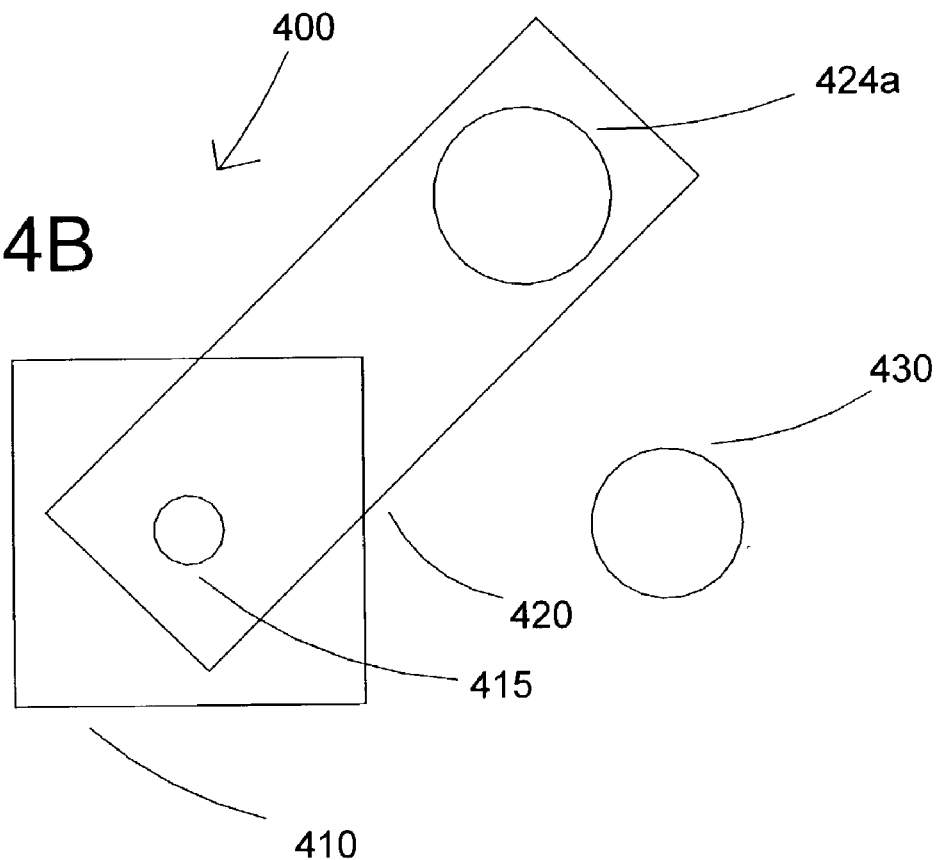
FIG. 4B shows the filter assembly of the FIG. 4A in a second state.

Filter assemblies 366, 368, 376, and 378 are described in FIG. 4A and FIG. 4B. The motor control 318 is electrically connected to receive control signals from the microprocessor 316. Two power supplies are shown in FIG. 3. A motor power supply 320 is shown for supplying energy to the motors and a lamp power supply 321 is shown for supplying power to the main projection light source or lamp 345. A lamp power supply interface 319 is electrically connected to the microprocessor 316 to receive control signals from the microprocessor 316 and signals are sent from the lamp power supply interface 319 to the lamp power supply 321 for controlling the main projection light source or lamp 345.

The IPLD 102 may include at least two different housings, such as the base or electronics housing 210 and the lamp housing 230 to facilitate remote positioning of the lamp housing 210 in relation to the base 230. The lamp housing 230 contains the optical components used to project light images upon a stage or projection surface 399 from focusing lens 351 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

The microprocessor 316 within the electronics housing 210 shown in FIG. 3, sends control signals to the auxiliary lamp or light source control interface 374. The auxiliary lamp control interface 374 is used to control the auxiliary lamp (or light source) 372. The window aperture 370 of the lamp housing 230 is shown in FIG. 3, for allowing input light for the reception of images traveling in the direction of arrow 382 from the projection surface 399 to the camera 364. The camera 364 may be a type of camera known in the art such as a device that receives light images with a contained camera sensor and converts the light images into electronic image data or signals. The camera 364, may be of a type, as known in the art, which may be constructed of only a camera sensor or the camera 364 may contain other optical components in the camera sensor optical path along with suitable control electronics. Another window aperture 371 in the lamp housing 230 is shown for allowing the exiting light traveling in the direction of the arrow 384 towards the projection surface 399 from the auxiliary lamp or light source 372. The main projection lamp 345 has its light energy collected by the collecting mirror 344 and a condensing lens 347. The collected light from the main projection lamp 345 passes through the condensing lens 347 and through the infrared cut off filter or hot mirror assembly 378. Next the light passes though filter assemblies 342 and 349. The light then passes through the light valve 346 and then through the filter assembly 376. The filter assembly 376 contains a filter that passes infrared but blocks visible light. Finally the light passes through the focusing lens 351 and travels the direction of the arrow 380.

The video control interface 317 of the electronics housing 210 sends image data or signals as received from the camera 364 to the microprocessor 316. The microprocessor 316 may send this image data or signals to the communications port 311 for transmission back to the central controller 150 or to other IPLDs on the communications system or apparatus 10 such as IPLDs 104 and 106 connected to communication interface 138 in FIG. 1. The communications port 311 may be a part of the processor 316, the communications port 311 can be any device capable of receiving the communication sent over the communication system. The camera 364 is sensitive to infrared light, to visible light, or both. The other IPLDs on the network or apparatus 10, such as IPLD 104 and IPLD 106, may use the image data received from the IPLD 102 by projecting the images that were captured by the camera 364 and thus originated at IPLD 102. The general capturing of images and sending image data to other lighting devices Is described in detail in pending patent application Ser. No. 10/090926, to Richard S. Belliveau, the applicant herein, publication no. 20020093296, filed on Mar. 4, 2002, titled "Method, apparatus and system for image projection lighting", which is incorporated by reference herein.

FIG. 4A shows a filter assembly 400 in a first state. The filter assembly 400 can be similar to the one or more of the filter assemblies 366, 368, 376 or 378 of FIG. 3. The filter assembly 400 is comprised of a motor or other actuator 410, a shaft 415, and a flag 420. The flag 420 includes a filter aperture 424a. An optical path that the filter assembly 400 is positioned across is shown as optical path 430. The optical path may be a camera optical path, such as the optical path of the camera 364 of FIG. 3, or a main projection light source optical path, such as the optical path of the main projection light source 345 in FIG. 3.

The motor or other actuator 410 has a shaft 415 attached by any suitable means to a flag 420 that contains the filter aperture 424a. In FIG. 4A the filter 424a is positioned in the optical path 430.

FIG. 4B shows the filter assembly 400 in a second state. In FIG. 4B the filter 424a is positioned differently by the motor or actuator 410 in relation to the optical path 430 compared to the position of filter 424a in FIG. 4A. In the case of FIG. 4B the filter 424a is positioned to be located out of the optical path 430.

FIG. 5A shows IPLDs 500 and 501 from a side view. Each of the IPLDs 500 and 501 may be identical to the IPLD 102 shown in FIG. 1. The IPLDs 500 and 501 may include base housings 510 and 515, yokes 520 and 525, and lamp housings 530 and 535, respectively.

The base housing 510 for IPLD 500 is rotatably connected to the yoke 520. The base housing 515 for IPLD 501 is rotatably connected to the yoke 525. The lamp housing 530 is rotatably connected to the yoke 520. The lamp housing 535 is rotatably connected to the yoke 525.

In FIG. 5A, a modulated IR (Infrared) light control signal 540 is shown being emitted from IPLD 500 and light control signal 540 is directed towards a stage or projection surface 548. A reflection of the modulated IR light control signal 540 from the stage 548 is shown as Infrared light signal 545 and is captured by the camera (not shown) contained at IPLD 501

IPLDs 500 and 501 both have an integral camera (which may be identical to camera 364), a main projection light source (which may be identical to main projection light source 345) and an auxiliary light source (which may be identical to auxiliary light source 372). A modulated IR light control signal 540 which is projected from the auxiliary light source in IPLD 500, which may be similar to or identical to auxiliary light source 372 of the IPLD 102, is shown projected from the lamp housing 530 of IPLD 500. The light signal 540 is shown being directed towards the stage or projection surface 548 and the reflection of the light signal 545 is captured, by the integral camera (not shown) contained at the lamp housing 535 of 501. The modulated IR light signal 540 from 500 can be designed to act as a communication signal that may send control messages or identifying information to receiving IPLDs such as IPLD 501. The art of modulating IR signals to provide communications is known in the art of consumer remote controls. Instead of the integral camera (similar to device 364 of FIG. 3) of the IPLD 501 capturing the image of the reflected signal off of the stage 548, the signal 540 from IPLD 500 could be pointed directly at the integral camera of IPLD 501.

With the lighting system or apparatus 10 in use, the operator of the central controller 150 first addresses the particular IPLD, such as IPLD 102, that the operator of the central controller 150 would like to command. Next the operator may command the particular IPLD, such as 102, to switch on the auxiliary light source 372 shown in FIG. 3. As shown in FIG. 3, a central controller 150 has a communications system comprised of communication line 136, communications interface 138, and communications line 142, connected to an IPLD 102 for sending address and command signals. The address signals are received by the communications port 311 of the IPLD 102 and sent to the microprocessor 316. The microprocessor 316 compares the address sent by the central controller 150 to the operating address of the IPLD 102. The operating address of the IPLD 102 may be set by an installation technician by varying a set of switches (not shown) located on the IPLD 102 itself or the unique operating address may be fixed in the memory 315. As is done for prior art IPLDs, if the address sent by the central controller 150 matches the operating address of the IPLD 102 then the IPLD 102 is ready to operate on command signals next sent by the central controller 150.

If the command received by the IPLD 102 is to a "switch on the auxiliary light source", i.e. auxiliary light source 372, the microprocessor 316 next sends the appropriate control signals to the auxiliary lamp control interface 374. The auxiliary lamp control interface 374 upon receipt of lamp on control signals from the microprocessor 316 next applies the appropriate power to the auxiliary light source 372 shown in FIG. 3. The originating power to the auxiliary light source 372 may be derived from the motor power supply 320, as IR LEDs (light emitting diodes), if used, do not require substantial amounts of power relative to the main projection lamp 345. As many as one hundred IR (infrared) LEDS (light emitting diodes) may be used to comprise the auxiliary light source 372. Usually the greater the amount of IR LEDS used to comprise the auxiliary light source 372 the greater the amount of IR energy emitted by the auxiliary light source. The auxiliary light source 372 may receive its power from a separate power supply (not shown). In any case the auxiliary lamp control interface 374, shown in FIG. 3, switches power to the auxiliary light source 372 when appropriate command signals are received from the microprocessor 316 providing an auxiliary lamp control parameter.

The lamp control parameter that comprises the auxiliary light source 372 may provide for the switching on or off of the auxiliary light source 372 or the auxiliary light source 372 may be modulated such as with pulse width modulation or a modulation that could provide a recognizable IR (infrared) light output signal to a remote IR receiver. The modulation of the auxiliary light source 372 could be used to project control instructions from the IPLD, such as IPLD 102. IPLDs may communicate special commands between each other using the modulated auxiliary light source or a particular IPLD, such as IPLD 102, may be able to recognize the IR "signature" of another IPLD, such as IPLD 104, that is projecting in a location that is imaged by the particular IPLD.

FIG. 5B shows a side view of IPLD 102 and several other devices to be described. The auxiliary light source 372, shown in FIG. 3, within the lamp housing 230 emits a modulated IR (Infrared) light signal 585 towards an external IR light receiving device 588. The external receiving device 588 is connected to control external devices such as the fireworks device 590 and the confetti cannon device 592.

The modulated IR light control signal emitted from the auxiliary light source of the lamp housing, such as lamp housing 230 of IPLD 102, could be used to trigger external receiving devices located at a distance from the emitting IPLD such as other theatrical effects that have been fitted with the appropriated IR light receivers connected to receive the modulated IR light signal from the auxiliary light source, such as auxiliary light source 372 in FIG. 3. The creation of modulated IR light signals by switching an IR light source is well known in the art of consumer remote control devices. Such remote control devices vary the modulation time and duration of infrared light pulses to create an infrared light control signal.

The auxiliary light source 372 in FIG. 3 within the lamp housing 230 emits a modulated IR light signal 585 towards an external IR receiving device 588. The external receiving device 588 has a sensor that receives the modulated IR signal from the auxiliary light source 372 of IPLD 102. The external receiver 588 processes the modulated IR control signals and controls devices that are connected to the external receiver 588. For example, the fireworks device 590 and a confetti cannon device 592 are shown connected to the receiver 588. The devices 590 and 592 can be remotely triggered or controlled by commands sent from the modulated IR signal emitted from the IPLD 102. The modulated IR signal as created by the auxiliary light source 372 shown in FIG. 3, is controlled as an auxiliary light source parameter and as such is controlled by an operator of the central controller 150 of FIG. 3.

The invention makes use of filter assemblies, such as filter assemblies 366 and 368 of FIG. 3. that are filters driven by actuators that either filters out IR and transmits visible or filters out visible and transmits IR. The control of the filter assemblies, such as filter assemblies 366 and 368, are additional control parameters for the IPLD, such as IPLD 102, that are controlled from the central controller, such as central controller 150. In FIG. 3, two filter assemblies 366 and 368 are shown in the path of the camera 364. Each of the filter assemblies 366 and 368 may be identical to the filter assembly 400 shown in FIGS. 4A and 4B. Filter assembly 366 may have its filter, such as filter 424*a* as an infrared blocking filter (or IR cut filter).

Filter 424*a* or filter aperture 424*a*, can be considered to be an IR cut filter. When the filter 424*a* is in the optical path of the camera 364 (between the camera and a stage or projection surface 399 in FIG. 3) infrared light is blocked to the camera 364 and the camera 364 only receives visible light. The blocking of infrared light insures that only accurate visible images from visible light are captured by the camera 364. The projection surface 399 can be a performer, an audience member, a stage, or any other projection surface.

The filter assembly 366 containing the infrared blocking filter (or IR cut filter) is controlled in and out of the optical path of the camera 364 by the motor or actuator such as 410 of FIG. 4A. The motor or actuator, such as 410 may be controlled by the motor control interface 318 of FIG. 3. The filter assembly 368 that has its filter, such as 424a, as a visible blocking filter may be the same type of filter assemblies as shown in FIGS. 4A and 4B. When the visible blocking filter (or the VIS cut filter), such as filter 424a is positioned into the optical path 430 of the camera 364, such as in FIG. 4A, only infrared light can be captured by the camera 364 and visible light is blocked. This allows the camera 364 to only capture IR light from the stage or other areas in the show while not allowing the camera 364 to capture visible light. The result is the camera 364 produces only IR images that are different than the visible images as seen by the audience as the audience sees only images created by visible light. This is also useful in providing new and pleasing special effects.

The filter assemblies 366 and 368 are operated to place their filters, such as 424a in and out of the path, such as path 430, of the camera, such as camera 364 by signals from the motor control interface 318 of FIG. 3. Wiring connections from the motor control interface 318 to the filter assemblies 366 and 368 are not shown for simplification. To operate the filter assemblies 366 and 368, first the operator of the central controller 150 selects an IPLD from a plurality of IPLDs, such as 102, 104, and 106 in FIG. 1, that the operator would like to control. The particular IPLD that the operator wants to control is sent the appropriate address over the communication system or apparatus 10 (such as from central controller 150 via communications line 136 and communications interface 138 and communications line 142 to IPLD 102), and received at the communications port 311 of FIG. 3. The address signal received by the communications port 311 is sent to the microprocessor 316. The microprocessor 316 compares the address sent by the central controller 150 to the operating address of the IPLD, such as IPLD 102. If the address matches the operating address of the particular IPLD from the plurality of IPLDs then the particular IPLD is ready to receive a command signal as desired by the operator of the central controller 150. The command signal sent over the communications system over lines 136,142 and communications interface 138, to the particular IPLD (for example 102 of FIG. 3) can be a command to place the IR filter, such as filter 424a, in the optical path 430 of the camera 364, which effectively blocks IR from reaching the camera 364.

This command of course is received by the particular IPLD communications port such as 311 of FIG. 3 and the command is processed by the microprocessor, such as 316 and appropriate control signals are sent to the motor control interface 318. The motor control interface 318 sends a control signal to the actuators of the filter assemblies, in this case 366 of FIG. 3. The signal causes the filter assembly 366 to place the IR cut filter in the optical path 430 of the camera 364. The VIS cut filter, or visible light cut filter, which may be a filter identical to filter 424a, with the exception that visible light is filtered instead of infrared light, in the filter assembly 368 of FIG. 3 operates from the central controller 150 in the same way after receiving specific commands for the operation of the visible light cut filter.

Improvements in camera sensors have improved low light and infrared imaging sensitivity. One type of camera sensor that has made this possible is the EXview HAD CCD (trademarked) developed by Sony (trademarked) Corporation of Tokyo, Japan. EXview HAD CCD (trademarked) sensor technology has made it possible to use as video information the charge of near infrared light that previously was not possible with conventional CCD technology. Camera devices using EXview HAD CCD (trademarked) technology can achieve 0.7 lux sensitivity in the visible light region and sensitivity greater than 0.02 lux in the IR light region wherein lux (symbolized lx) is the unit of illuminance or luminance in the International System of Units. The lower the value of lux the better the camera can image in low light situations). One such camera useful to the integration of IPLDs and cameras is the Sony (trademarked) FCBEX480A. This camera can be configured to receive control information from a video control interface such as video control interface 317 shown in FIG. 3. This particular camera has an IR cut filter assembly similar to the filter assembly 400 as shown in FIGS. 4A and 4Bb included in its optical path that can be controlled with the video control interface 317. Video control interface 317 can receive command signals from the microprocessor 316 to operate the functions of the camera 364 and the integral IR cut filter. The functions of the camera as controlled by the video control interface 317 are commanded by the central controller 150 over a communication system or apparatus 10 as previously described above.

The auxiliary light source 372 of FIG. 3 may be omitted if required. In this case it is possible to use the IR generated by the main projection light source or lamp 345. It is known in the art to filter any undesired infrared light out from a main projection light source, such as from main projection light source 345. To do this a cold mirror as known in the art may be used as a reflecting mirror 344 as shown in FIG. 3. The cold mirror (such as mirror 344) only reflects visible light while IR light passes through the cold mirror 344. The undesired IR light from the main projection lamp 345 therefore is greatly reduced and does not pass as light shown by arrow 380. The projection optical system located in the housing 102 of FIG. 3 is comprised of the reflecting mirror 344, the main projection lamp 345, the condensing lens 347, the filter assemblies 378, 342, 349, and 376, the light valve 346 and the focusing lens 351. This reduces heat to sensitive components.

Also it is known in the prior art to use a hot mirror, not shown. The mirror344 is the mirror used to capture and reflect light. We call it the reflecting mirror (as in the above paragraph). A hot mirror is a different component (as known in the art) it is a flat filter glass that allows visible light to pass while reflecting IR. It is commonly (as known in the art) used after a lamp to reflect IR light but pass visible light. A hot mirror which is a device known in the art and is not shown can be placed in the projection optical system such as perpendicular to the optical system path, such as path 430, (the projection optical path from the main lamp is in the direction of arrow 380 of FIG. 3), so that IR (infrared) light is reflected back toward the main projection light source or lamp 345 and visible light passes freely through. Filter assembly 378 in FIG. 3 may contain a hot mirror that reflects IR yet allows visible light to pass. The filter assembly may be designed similar to that shown in FIGS. 4A and 4B.

When the IR filter, such as filter 424a in FIG. 4A, of the filter assembly 378 is in the projection light path, such as path 430, visible light passes freely through but IR is blocked or reflected. This allows components that are sensitive to heat to be used and prevents overheating damage to those components as known in the art. Under certain conditions the filter assembly could remove the hot mirror filter of filter assembly 378 from the projection optical path, such as path 430 and allow the IR and visible light to pass freely in the direction of arrow 380. When the hot mirror of filter assembly 378 is removed allowing IR and visible light to pass freely, filter assembly 376 may place a VIS (visible light) blocking filter in the projection light path, such as path 430. In this way visible and IR from the main projection lamp 345 is allowed to pass through the filter assembly 378 but the visible light is blocked by the VIS cut filter 376. Only the IR is allowed to pass through the lens 351 in the direction of arrow 380. The filter assemblies 378 and 376 would be operated by command signals sent over the communication system from the central controller similar to that explained for filter assemblies 366 and 368. In this way the auxiliary light source, such as auxiliary light source 372, is not required. In the preferred embodiment of the present invention an auxiliary light source 372, is used. This avoids designing the optical system for the main projection lamp 345 to avoid overheating when IR passes through the system.

In some cases enough IR may pass through the hot mirror filter of filter assembly 378 even when the filter is in the main projection lamp optical path that still allows sufficient IR energy that can be used for illumination of the audience or the stage in a show. In this case only the VIS cut filter assembly 376 may be required as it is still an advantage to block visible light while projecting only IR. With the VIS filter in place and sufficient IR energy emitted from the main projection lamp 345, images created by the light valve 346 and projected by the output lens 351 in the direction of arrow 380 on to a projection surface, would only be seen or imaged by an IR camera. This could provide pleasing effects to an audience where text, graphic images or other images are created by the light valve 346 of FIG. 3 and the visible light is filtered out by the VIS ("VIS" stands for visible light) cut filter 376 and only the residual IR light and the associated image created by the light valve 346 is passed through the focusing lens 351 in the direction of arrow 380 toward the stage or other projection surface 399. The integrated camera 364 of FIG. 3 can image the IR images created by the light valve 346 and send these images to the video control interface 317. The images can next be sent to the processor 316 for processing and out to the communications port 311. IPLDs, such as 102, 104, and 106, may send camera images between each other as explained in the applicant's pending patent application Ser. No. 10/090926 titled "Method, apparatus and system for image projection lighting" filed Mar. 4, 2002, incorporated by reference herein. The visualization of graphical text or other images by an audience that are projected by the light valve 346 appear only in IR. The integrated camera 364 or a separate remote camera may be used to visualize the images projected in IR only by the IPLD, such as IPLD 102.

Cameras that are capable of capturing images of infrared light or imaging infrared produce a black and white image or monochrome image when imaging infrared. The black and white image produced by the camera contains different intensity levels of black to white based upon the amount of infrared imaged captured by the camera. The monochrome image is similar to that of a black and white television. The IPLD 102 of FIG. 3 can colorize the black and white infrared image as produced by the camera 364. This is done by sending the infrared camera image captured by the camera 364 to the video control interface 317 The video control interface 317 or the processor 316 or a separate video control system can have features for manipulation of the incoming video image. Colorization of the infrared image can occur with the video control interface 317 first receiving the black and white images from the camera 364. An operator of the central controller, such as central controller 150, first addresses the particular IPLD to be controlled such as 102 of FIG. 3. Next the operator may command the filter assembly 366 containing the IR cut filter, such as filter 400 shown in FIG. 4A, to remove the IR cut filter, such as 400, out of the camera optical path, such as path 430, as already explained above. With the IR cut filter out of the optical path 430, the camera 364, is most sensitive to IR. Next the operator may enable the IR auxiliary light source 372 to be on as explained in detail above. The IR images received and captured by the camera 364 might be for example a performer located on a stage. The IR images from the camera 364 are sent to the video control interface 317. The operator may send a command from the central controller 150 to colorize the IR images that are being captured by the camera 364. In this case the communication port 311 receives the command signals to colorize the image. The command signals are forwarded to the microprocessor 316 where they are processed and control signals are sent to the video control interface 317. The video control interface 317 is capable of receiving the IR image signals as sent by the camera 364 and associating levels of red, green and blue (additive colors) to the varying levels of intensities of the black and white IR camera signal from the camera 364. For example, the dark areas of the IR monochrome image that is associated with low IR level intensities might be associated with the blue color to represent a colder part of the image. The brightest part (highest intensity) of the IR monochrome image might be associated with a red color as the brightest part of the IR monochrome image is the warmest. In this way the black and white or monochrome image can be colorized and provide a pleasing effect to the audience. The colorized IR images can be projected by the IPLD itself, such as IPLD 102, or sent to other IPLDs, such as IPLD 104 or 106 for projection.

It is also possible to modify the camera images as received by the video control interface 317 in other ways. For example, the camera images may be modified in other ways by the electronics of the IPLD 102, such as the video control interface 317. The images from or camera 364 of FIG. 3, can be modified and then may be projected by the projection optical system as formed by the light valve 346 from lens 351 in the direction of arrow 380. The images captured by the camera 364 may be modified with video distortions, magnifications, rotation and other modifications which provide a pleasing visual effect. The modified camera images can be projected from the projection optical system of the IPLD 102 containing the camera 364 or the modified images or data reflecting the modified images can be sent to the communications port 311 for transmission to other IPLDs, such as IPLD 104, 106, or 108, as described above.

The camera 364 of the apparatus or IPLD 102 has an optical path that is not superimposed with an optical path of the main projection lamp 345. This insures the highest level of efficiency as the two optical paths are separate and are not subject to the compromises. This is contrary to the prior art. The two optical paths as shown by arrows 380 and 382 of FIG. 3, are parallel.

With the optical path 382 of the camera 364 and the optical path 380 of the main lamp projection lamp 345 not superimposed but parallel, as shown by the arrows of 380 and 382, the images captured by the camera 364 are not truly centered with the projected images projected on the optical path 380 of the main projection lamp 345. The images are not centered by the distance the camera is mounted away from the projection lens 351 in the IPLD 102.

One object of the invention is to remotely adjust the position of the camera 364 in the IPLD 102 so that the camera's optical path 382 can be substantially aligned with the main projection lamp optical path 380 on the projection surface 399. The positioning of the camera 364 can be controlled by commands from the central controller 150.

Another object of the invention is to adjust the position of the camera 364 in the IPLD 102 so that the camera's optical path 382 can be aligned with the main projection lamp optical path 380 on the projection surface 399 automatically. Using the distance the focusing lens 351 of the IPLD 102 needs to travel to obtain a focus on the projection surface 399 at a particular distance the IPLD processor 316 automatically changes the positioning of the integrated camera 364 to align the camera optical path 382 and the main projection lamp optical path 380 on the projection surface 399.

It is another object of the invention to adjust the position of the camera 364 in the IPLD 102 so that the camera's optical path 382 can be adjusted in relation to the main projection lamp's optical path 380 on the projection surface 399.

The main projection lamp optical path 380 outside of the IPLD 102 can be referred to as the projection field. The camera optical path 382 outside or the IPLD 102 can be referred to as the camera field.

Figure 6:
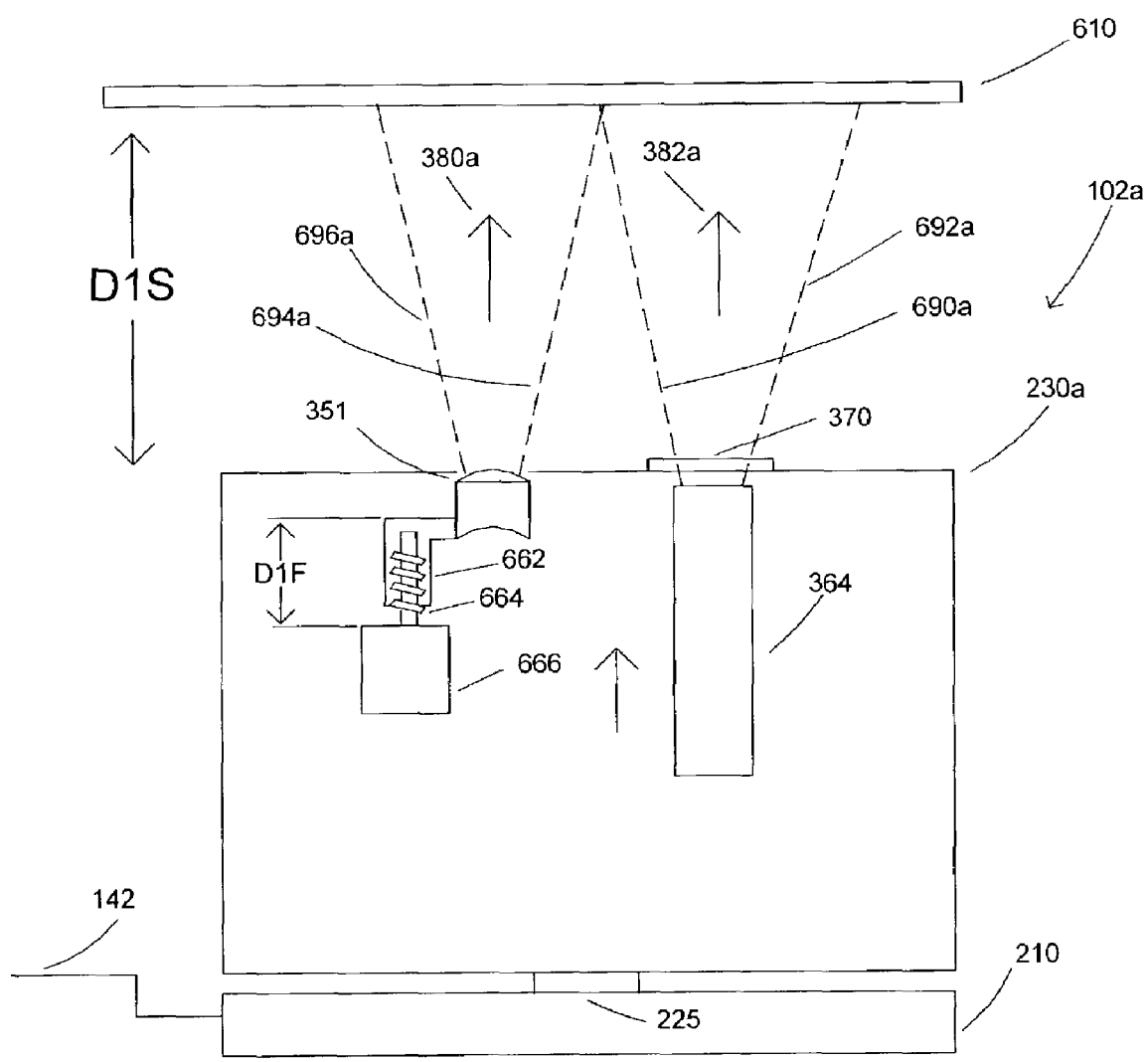
FIG. 6 shows a projection surface at a first distance from an image projection lighting device in accordance with an embodiment of the present invention.

FIG. 6 shows a projection surface 610 at a distance of approximately D1S from an image projection lighting device (IPLD) 102a. Dotted lines 690a and 692a show the camera field outside of the lamp housing 230a. The camera field, shown by 690a and 692a, is established by a camera optical path 382a of the camera 364. Dotted lines 694a and 696a show the projection field outside of the lamp housing 230a. The projection field is established by a main projection lamp optical path 380a. The lamp housing 230a is similar to the lamp housing 230 of FIG. 3 except that some of the optical components are omitted for simplification and a focus motor drive system for the focusing lens 351 is additionally shown. A bearing 225 is shown, which may be identical to the bearing 225 of FIG. 2 and 225 of FIG. 3. An electronics housing 210 is shown which may be identical to the electronics housing 210 of FIG. 3. A communications cable 142 is shown that may be identical to the communications cable 142 of FIG. 1 and FIG. 3. A focus motor 666 is shown with a lead screw shaft 664 threaded into a power nut bracket 662. The power nut bracket 662 is attached to the focusing lens 351a. The lens 351 may be identical to the lens 351 of FIG. 3.

A distance D1F is the distance from the focusing lens to the motor 666. The camera 364 may be identical to the camera 364 of FIG. 3 and is shown with window 370 that may be identical to the window 370 of FIG. 3.

Figure 7:
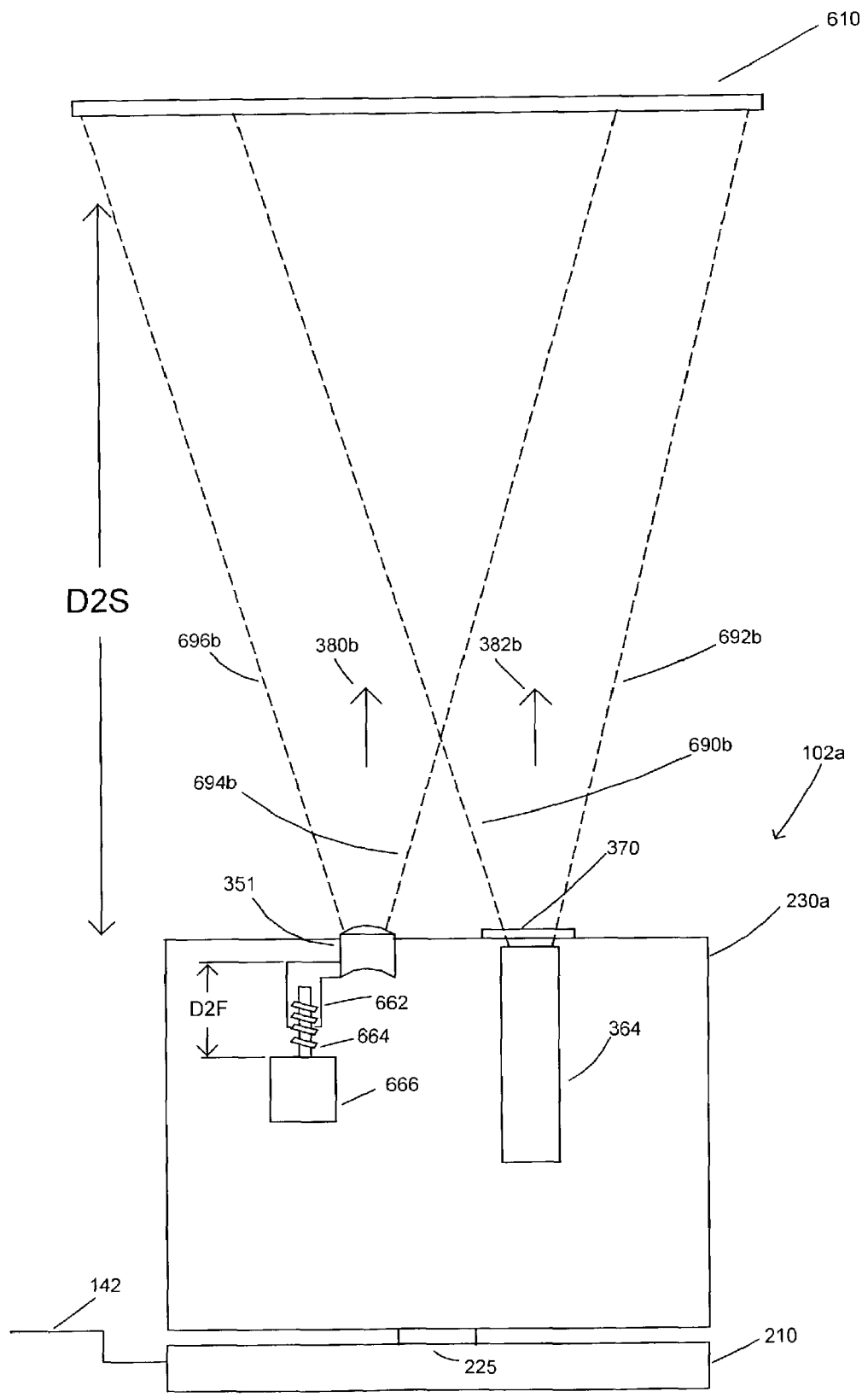
FIG. 7 shows the projection surface of FIG. 6 at a second distance from the image projection lighting device of FIG. 6, wherein the second distance is further than the first distance of FIG. 6.

FIG. 7 shows a projection surface 610 at a distance of approximately D2S from IPLD 102a. Dotted lines 690b and 692b show the camera field outside of the lamp housing 230a. The camera field is established by the camera optical path 382b. Dotted lines 694b and 696b show the projection field outside of the lamp housing 230a. The projection field is established by the main projection lamp optical path 380b. The lamp housing 230a may be similar to or identical to the lamp housing 230 of FIG. 3 except that some of the optical components are omitted for simplification and a focus motor drive system for the focusing lens 351 is additionally shown. A bearing 225 is shown that may be identical to the bearing 225 of FIG. 2 and 225 of FIG. 3. An electronics housing 210 is shown which may be identical to the electronics housing 210 of FIG. 3. A communications cable 142 is shown which may be identical to the communications cable 142 of FIG. 1 and FIG. 3. A focus motor 666 is shown with a lead screw shaft 664 threaded into a power nut bracket 662. The power nut bracket 662 is attached to the focusing lens 351. The lens 351 may be identical to the lens 351 of FIG. 3. A distance D2F is the distance from the focusing lens 351 to the motor 666. A camera 364 may be identical to the camera 364 of FIG. 3 and is shown with a window 370 that may be identical to the window 370 of FIG. 3.

FIG. 6 shows a lamp housing 230a similar to the lamp housing 230 of FIG. 3. Lamp housing 230a of FIG. 6 has been simplified by not showing all of the components shown in the lamp housing 230 of FIG. 3. The focusing lens 351 of FIG. 6 is shown and is similar to the focusing lens 351 of FIG. 3. Additionally a means for remotely adjusting the focus of the focusing lens 351a is shown. Different means for mechanizing the focusing lens 351 for remote control of focus is known in the art. The means shown in FIG. 6 shows the focusing lens 351 attached to a power nut 662 that is in turn linearly driven by lead screw shaft 664 that is attached by any suitable means to the motor 666. The motor 666 is fixed to the lamp housing 230a by any suitable means. As the lead screw 664 is rotated the power nut 662 with the focusing lens 351 moves towards or away from the motor 666. The movement of the lens 351 by the motor lead screw drive allows remote control of the focus of the lens 351 as known in the art. The motor 666 is driven by control signals from the motor control interface 318 of FIG. 3. The motor control interface 318 of FIG. 3 receives control signals from the processor 316. The communications port 311 of FIG. 3 receives commands over the communication system and the communications port 311 passes these control commands to the processor 316 for remote control of the focus lens 351. The remote control of a focus lens in a multiparameter light by a central controller is known in the art.

Motor 666 of FIG. 6 may be a stepping motor or a servo motor or any actuator that can be incrementally controlled by the processor 316 of FIG. 3. The incremental control of the motor 666 by known values allows the operator of the central controller 150 to precisely position the focusing lens 351 with numerical values as known in the art. For example if the focusing lens 351 of FIG. 6 needs to move 2 mm from the motor 666 to obtain the proper focus of the image on the projection surface 610 a value of "2" may be selected from the central controller 150. The focus value change commands sent from the central controller 150 as received by the image projection lighting device 102 control the focusing lens 351 distance D1F of FIG. 6 and D2F of FIG. 7.

FIG. 6 illustrates the projection field as established by the main projection light source optical path formed by dotted lines 696a and 694a on the projection surface 610 and are not centered with the camera field as established by the camera optical path as illustrated by dotted lines 690a and 692a. FIG. 7 illustrates a projection surface 610 that is at a distance greater from the IPLD 102a shown as D2S than the distance D1S of FIG. 6. The focusing lens distance D2F of FIG. 7 is greater than the focusing distance D1F of FIG. 6 because the distance D2S to the projection surface 610 is greater than the distance D1S to the projection surface 610. The lens 351 has been moved a greater distance from the motor 666 from FIG. 6 to FIG. 7 by known incremental movements of the motor lead screw shaft 664. These incremental movements of the focusing lens 351 of IPLD 102a are controlled by the central controller 150 as known in the art. The distance from the projection surface 610 of FIG. 6 shown as D1S and the distance of the lens 351 to the motor 666 shown as D1F to achieve the desired focus of the images on the projection surface 610 as created by the light valve 346 (shown in FIG. 3) has a known and repeatable relationship. The distance of the focusing lens 351 to the motor 666 is used by way of example since the motor 666 is fixed to the lamp housing 230a and could be similar to a distance of the focusing lens 351 to the light valve 346 which is also fixed to the lamp housing 230a not shown in FIGS. 6-9, for simplification. In any case the to achieve a focus of the images created by the light valve 346 of the IPLD 102 or 102a on a projection surface, such as 610, at a particular distance, the focusing lens 351 must move a known amount to achieve focus at that particular distance.

FIG. 7 shows that the projection surface 610 is at a distance, D2S, from the IPLD 102a, which is greater than the distance D1S of FIG. 6. As the distance from the projection surface 610 to the IPLD 102a increases the camera field (as illustrated by dotted lines 690b and 692b) and the projection field (as illustrated by 694b and 696b) appear to be in better alignment (nearly superimposed) closer to the projection surface as shown in FIG. 7. Depending on how close the camera 364 of FIG. 7 is mounted to the focusing lens 351 in the IPLD 102a and how far the projection surface 610 is from the IPLD 102a, the lack of alignment of the camera field and the projection field may or may not be acceptable to the viewer or operator or the lighting system such as system 10 of FIG. 1.

Figure 8:
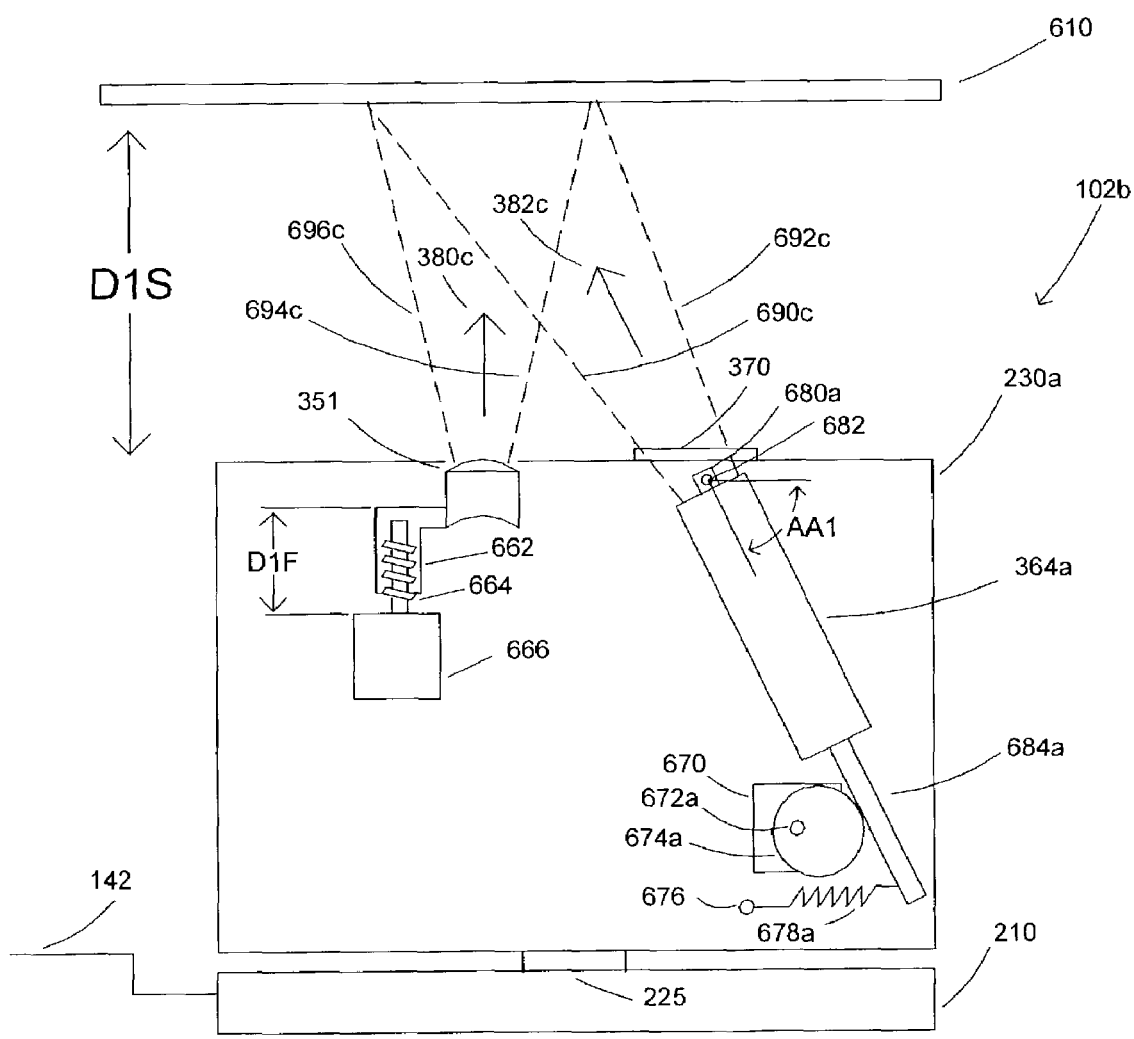
FIG. 8 shows a projection surface at a third distance from an image projection lighting device in accordance with an embodiment of the present invention and also shows a camera tilted at an angle.

FIG. 8 shows a projection surface 610 at a distance illustrated as D1S from IPLD 102b. The projection surface 610 may be identical to the projection surface 610 of FIG. 6. The distance illustrated as D1S may be identical to the distance D1S of FIG. 6. Dotted lines 690c and 692c show the camera field outside of the lamp housing 230a. The camera field is established by the camera optical path 382c. Dotted lines 694c and 696c show the projection field outside of the lamp housing 230a. The projection field is established by the main projection lamp optical path 380c. The lamp housing 230a is similar to the lamp housing 230 of FIG. 3 except that some of the optical components are omitted for simplification and a focus motor drive system for the focusing lens 351 is additionally shown. A bearing 225 is shown that is similar to the bearing 225 of FIG. 2 and 225 of FIG. 3. An electronics housing 210 is shown which is similar to the electronics housing 210 of FIG. 3. A communications cable 142 is shown that is similar to the communications cable 142 of FIG. 1 and FIG. 3. A focus motor 666 is shown with a lead screw shaft 664 threaded into a power nut bracket 662. The power nut bracket is attached to the focusing lens 351. The lens 351 is similar to the lens 351 of FIG. 3. A distance D1F is approximately the distance from the focusing lens 351 to the motor 666 and is similar to the distance D1F of FIG. 6. A camera 364a is similar to the camera 364 of FIG. 3 and is shown with a window 370 that is similar to 370 of FIG. 3. A motor 670 has a shaft 672a attached to a cam wheel 674a by any suitable means. The camera 364a is mounted to a mounting bracket 680a that has a pin 682 applied as a pivot point. The camera 364a is also mounted to a cam follower bracket 684a that follows the cam wheel 674a. A spring 678a is attached to the cam follower bracket 684a by any suitable means and attached to the housing 230a by a fastener 676. The angle AA1 is shown to display the deviation of the camera optical path from perpendicular to the window 382.

Figure 9:
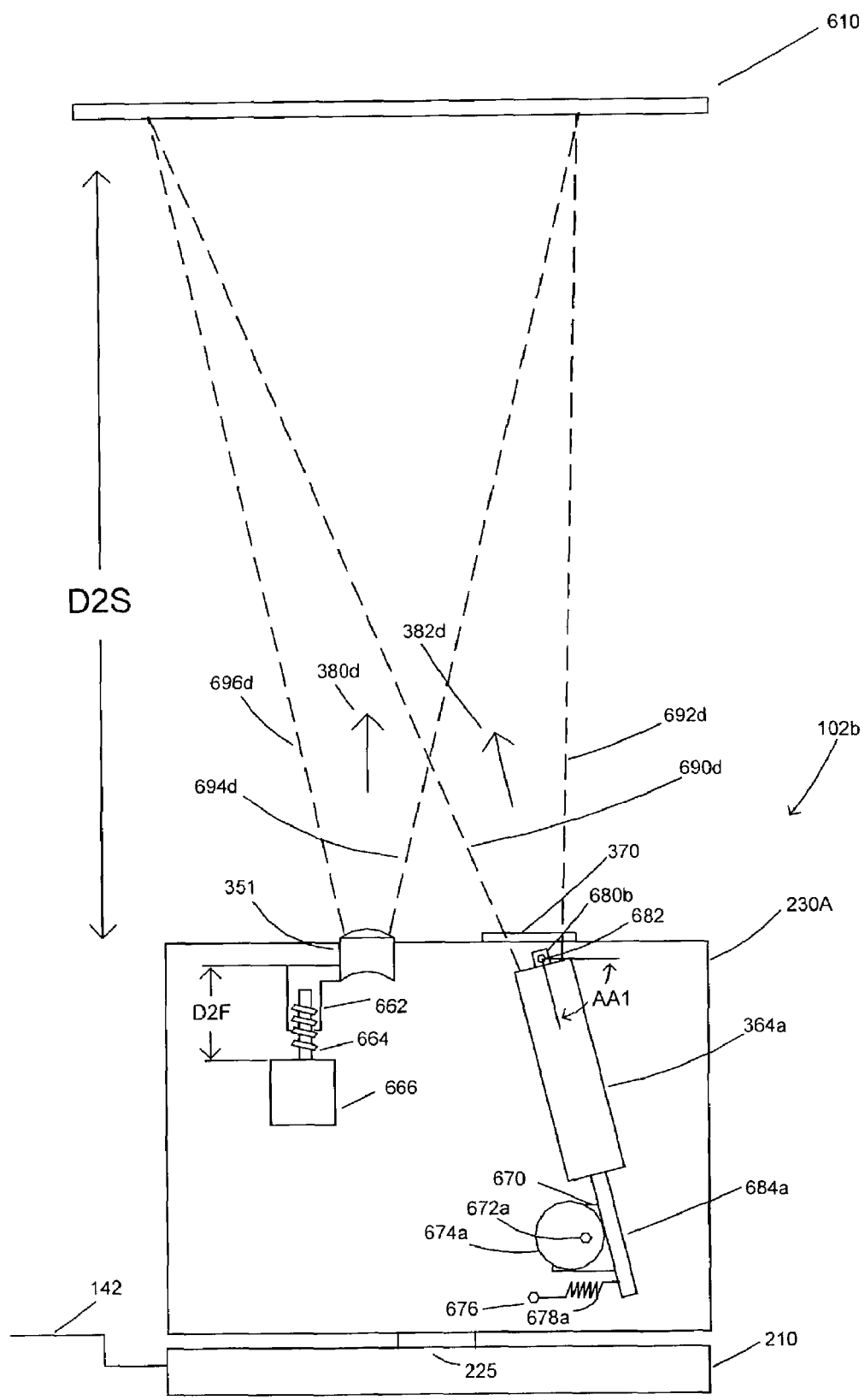
FIG. 9 shows a projection surface at a fourth distance from the image projection lighting device of FIG. 8, wherein the fourth distance is further than the third distance, and also shows a camera tilted at an angle.

FIG. 9 shows a projection surface 610 at a distance illustrated as D2S from IPLD 102b. The projection surface 610 is similar to the projection surface 610 of FIG. 7. The distance illustrated as D2S is similar to the distance D2S of FIG. 7. Dotted lines 690d and 692d show the camera field outside of the lamp housing 230a. The camera field is established by the camera optical path 382d. Dotted lines 694d and 696d show the projection field outside of the lamp housing 230a. The projection field is established by the main projection lamp optical path 380d. The lamp housing 230a is similar to the lamp housing 230 of FIG. 3 except that some of the optical components are omitted for simplification and a focus motor drive system for the focusing lens 351 is additionally shown. A bearing 225 is shown that is similar to the bearing 225 of FIG. 2 and 225 of FIG. 3. An electronics housing 210 is shown which is similar to the electronics housing 210 of FIG. 3. A communications cable 142 is shown that is similar to the communications cable 142 of FIG. 1 and FIG. 3. A focus motor 666 is shown with a lead screw shaft 664 threaded into a power nut bracket 662. The power nut bracket is attached to the focusing lens 351. The lens 351 is similar to the lens 351 of FIG. 3. A distance D2F is the distance from the focusing lens to the motor 666 and is similar to the distance D2F of FIG. 7. A camera 364a is similar to the camera 364 of FIG. 3 and is shown with a window 370 that is similar to 370 of FIG. 3. A motor 670 has a shaft 672a which is similar to shaft 672a of FIG. 8 and is attached to a cam wheel 674a which is similar to cam wheel 674a of FIG. 8 by any suitable means. The camera 364a of FIG. 3 which is similar to camera 364a of FIG. 8 is mounted to a mounting bracket 680a which is similar to bracket 680a of FIG. 8a that has a pin 682 applied as a pivot point. The camera is also mounted to a cam follower bracket 684a which is similar to bracket 684a that follows the cam wheel 674a which is similar to 674a of FIG. 8. A spring 678b is similar to spring 678a of FIG. 8 and is attached to the cam follower bracket 684a which is similar to cam follower bracket 684a of FIG. 8 by any suitable means and attached to the housing 230a by a fastener 676. The angle AA1 is shown to display the deviation of the camera optical path from perpendicular to the window 370.

FIG. 8 shows an IPLD 102b at a distance D1S similar to the distance D1S of FIG. 6. The camera 364a is shown tilted by a tilting mechanism so that the camera field (shown by dashed lines 692c and 690c) and the projection field (shows by dashed lines 694c and 696c) better appear to align or superimpose to the viewer or operator on the projection surface 610. The camera 364a has a mounting bracket 680a that has a pin 682 applied as a pivot point. An additional bracket 684a is used as a cam follower and is moved by the cam wheel 674a. The cam wheel 674a is driven by a motor 670 and is connected to the motors shaft 672a in any suitable fashion. A return spring 678a is attached to the cam follower bracket 684a at one end in any suitable fashion and to the lamp housing 230a with a fastener 676.

The motor 670 is connected by wiring not shown to the motor control interface such as motor control interface 318 of FIG. 3. Command signals are sent from a central controller, such as central controller 150 of FIG. 1 via the communication system which may include 136, 138, and 142 of FIG. 1. The communication port 311 of FIG. 3 receives control commands over the communication system to incrementally rotate the motor shaft 672a as commanded by the central controller 150. The communication port 311 forwards these commands to the microprocessor 316. The processor 316 after receiving a command to incrementally move the motor shaft 672a a particular location value, forwards the correct control signals to the motor control interface 318. The motor control interface 318 provides the driving signals to the motor 670 of FIG. 8 over wires not shown. The driving signals move the motor shaft 672a a precise increment and in turn the cam wheel 674a is rotated that particular increment. The rotation of the cam wheel 674a on the cam follower bracket 684a changes the angle of the camera 364a optical path from perpendicular to the window 370 similar to FIG. 7, to the angle AA1. The camera angle change results in a change of the camera optical path 382c position or angle in relation to the main projection lamp optical path 380c.

FIG. 9 shows a projection surface 610 that is at a distance shown as D2S from lamp housing 230a. For the camera field and the projection field to closely align themselves on the projection surface the camera angle AA2 is slightly reduced from the angle AA1 shown if FIG. 8. The motor 670 has been signaled to move its shaft 672a and in turn cam wheel 674a has been rotated from the position held as 674a of FIG. 8. The return spring 678a that is attached to the lamp housing 230a by fastener 676 keeps the cam follower bracket 684a tight against the cam wheel 674b.

FIG. 9 shows that the camera field as illustrated by dotted lines 690d and 692d and the projection field as illustrated by the dotted lines 694d and 696d. The camera field and the projection field have been aligned on the projection surface by the change of angle AA2 from that of the required angle AA1 of FIG. 8. When the IPLD lamp housing 230a is rotated in relation to the electronics housing 225 by commands from the central controller as known in the art, the desired projection surface in the direction of the projection field and camera field may be at a greater or lesser distance such as D1S or FIG. 8 and D2S or FIG. 9. When the projection surface distance is changed it is desirable to adjust the focus of the focusing lens to obtain a focused image. With the invention when a new projection surface distance requires focusing of the focusing lens of a particular IPLD it is possible for the operator of the central controller to also change the position of the camera to best align the camera field and the projection field on the projection surface.

In FIG. 9 the distance to the projection surface from the lamp housing 230a of IPLD 102 illustrated as D2S has been increased from the distance D1S of FIG. 8. The operator will naturally want adjust the focus of the lens 351 in FIG. 9 to bring the projected image into focus. Because D2S of FIG. 9 is greater than the previous distance D1S of FIG. 8 an adjustment of the camera position angle AA2 is best to align the camera field to the projection field. The operator sends the appropriate command signals over the communication system as previously described to be received by the communications port 311 or FIG. 3. The communication port 311 receives the commands and sends the commands to the processor 316 where they are processed and the appropriate control signals are sent to the motor control interface 318. The motor control interface 318 of FIG. 3 incrementally moves the motor shaft 672b of the motor 670 of FIG. 9 so that the cam wheel 674a by way of rotational pressure on the cam follower bracket 684a changes the camera 364a angle illustrated as AA2. The operator by using command signals from the central controller will adjust the angle of the camera field to best suit the projection field depending of the distance from the projection surface. Also the camera field of IPLD 102 may be adjusted by the operator of the central control system to highly deviate away from the projection field of IPLD 102 so that the camera field is located on a completely different surface in relation to the projection field. The deviation of the camera field purposely away from the projection field may be controlled by the operator of the central controller so that the camera may receive images from a projection surface that are not located in the projection field.

For any change in distance such as distance D1S and D2S or FIGS. 8 and 9 respectively, the focusing lens 351 needs to be have its distance from motor 666 adjusted in order to achieve the best focus at a particular distance such as D2S. As known in the art, there is a relationship between the distance a particular lens, such as 351, needs to move from the image created by the light valve, such as light valve 346, to the distance to the projection surface, such as projection surface 610, to achieve the best focus. A lookup table can be created in the memory 215 of FIG. 3 in IPLD 102. This lookup table can be a document in memory which specifies the number or increments that the motor 666 has to turn the lead screw shaft 662 in order to achieve focus at a particular distance. For example, the lookup table may have in its contents, or in a document in memory, that six incremental moves of the motor lead screw shaft 664 result in a distance of D2F and a good focus at distance D1S of FIG. 8. The lookup table can also contain the knowledge that at distance D1S of FIG. 8 the camera 364a requires the position or angle AA1 which may be three increments of the motor shaft 672a that rotates the cam wheel 674a to change the camera angle AA1 as previously explained.

The lookup table may contain the range or useful projection distances from the IPLD 102a for example if the focusing lens 351 of FIG. 9 is moved by moving the lead screw 664 twelve increments to a value of D2F this achieves a good focus at distance D2S. The lookup table can also contain the knowledge that at distance D2S of FIG. 9 the camera 364a requires the position AA2 which is six increments of the motor shaft 672b that rotates the cam wheel 674b to change the camera angle AA2. This can be done for the full range of useable projection distances to the projection surface, such as 610, to be focused upon. A lookup table can be included in memory, such as memory 315 of FIG. 3. The lookup table may have documentation of the relationship between the distance of movement of the focusing lens 351 and the change of position of the camera 364 or 364a. The processor, such as processor 316 of FIG. 3 can automatically update the position of the camera such as angle AA2 of FIG. 9 as the lens 351 is focused to obtain a best image on various projection surfaces at the various distances from the IPLD 102a.

An operator of the central control system 150 sends a command to change the focus of a particular IPLD such as IPLD 102a of FIG. 9. The appropriate command is received by the communications port 311 of FIG. 3. The command is then sent to the processor 316. The processor 316 sends the control signals to the motor control interface 318. The motor control interface 318 sends the appropriate number of increments to move the focus motor lead screw shaft 662 of IPLD 102a as commanded originally from the operator of the central controller 150. Accessing the memory 315, the processor 316 looks up in the lookup up table the number of increments sent to the focusing lens motor lead screw shaft 664 that achieved a distance of D2F of FIG. 9 and then finds the required number of increments required to move the motor shaft 672b to achieve the angle or position AA2 that in turn provides an alignment of the camera field and the projection field on the projection surface 610 at a distance of D2S of FIG. 9. In this way the operator need only to command changes to the IPLD 102a for adjusting the focusing lens 351 for a particular projection distance and the camera position is automatically adjusted for best alignment on the projection surface 610.

Instead of a lookup table that has a finite number of increments required for the adjustment of the camera position in relation to the focus lens position as described above, it is preferred that a ratio be established between the focus lens 351 distance of travel and the required position of the camera 364 or 364a to achieve the alignment of the camera field and the projection field on the focused projection surface, such as 610. For example four millimeters (mm) of focus lens travel equates to two degrees of camera angle change to obtain the best alignment of the camera field and the projection field. In this example a two to one ratio is established and the processor of IPLD 102 as described needs only update the camera 364 or 364a position angle change by this ratio. Using a ratio to calculate the angle the camera 364a changes in relation to the movement of the focusing lens 351. Any camera angle can be calculated for any focus lens movement and in turn obtain best alignment of the camera field and the projection field at the projection surface, such as 610. It is only necessary as known in the art to store the ratio in memory 315 of FIG. 3 and have the processor 316 use the ratio stored in the memory 315 to apply the appropriate change of camera position when the focus lens 351 is adjusted to achieve the best alignment on the projection surface 610 of the camera field and the projection field.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A lighting apparatus comprising:
   a lamp housing including a light valve and a main projection lamp;
   a communications port for receiving address and command signals from a central controller;
   a camera;
   a visible light cut filter;
   wherein the camera is capable of capturing visible and infrared images, and wherein the camera has an optical path;
   wherein the visible light cut filter is located in the optical path of the camera;
   and wherein the visible light cut filter is controlled to be placed in or out of the camera optical path by one or more command signals received by the communication port.

2. A lighting apparatus comprising:
   a lamp housing including a light valve and a main projection lamp;
   a communications port for receiving address and command signals from a central controller;
   a camera, having an optical path;
   a visible light cut filter;
   wherein the camera is capable of capturing visible and infrared images;
      wherein the visible cut filter is located in the optical path of the main projection lamp; wherein the visible light cut filter is controlled to be placed in or out of the optical path of the camera by one or more command signals received by the communication port.

3. A lighting apparatus comprising:
   a lamp housing including a light valve and a main projection lamp,
   a communications port for receiving address and command signals from a central controller,
   an auxiliary light source,
   wherein the auxiliary light source generates and projects a modulated infrared control signal and the modulated infrared control signal is used to control an external device.

4. A lighting apparatus comprising:
   a lamp housing including a light valve and a main projection lamp,
   a communications port for receiving address and command signals from a central controller,
   an auxiliary light source,
   wherein the auxiliary light source generates and projects a modulated infrared control signal that provides control instructions.

5. An apparatus comprising
   a first lighting device comprising
      a lamp housing comprising a first lamp and a second lamp;
      a light valve;
      an output lens;
      a camera;
      a base housing comprising a microprossesor and a communications port;
      wherein the lamp housing can be rotated in relation to the base housing by a motor;
   wherein a first light can be directed from the first lamp to the light valve and through the output lens onto a projection surface;
   wherein a second light can be projected from the second lamp onto the projection surface;
   wherein the second light is not projected through the output lens; and
   wherein the camera captures an image on the projection surface wherein the image is illuminated by the second light.

6. The apparatus of claim 5 wherein
the second light projected from the auxiliary light source is infrared light.

7. The apparatus of claim 5 wherein
the camera can capture images in infrared light or in visible light.

8. The apparatus of claim 5 wherein
the first light has at least one parameter which can be controlled by a central controller.

9. The apparatus of claim 5 further comprising
a first filter capable of substantially blocking infrared light; and
wherein a central controller can cause the first filter to substantially prevent the camera from receiving infrared light.

10. The apparatus of claim 5 further comprising
a first filter capable of substantially blocking visible light; and
wherein a central controller can cause the first filter to substantially prevent the camera from receiving visible light.

11. A lighting device comprising
a main projection light source which generates a first light;
a light valve;
a lamp housing in which the main projection light source and the light valve are located;
a communications port capable of receiving an address signal which selects the lighting device and the communications port capable of receiving one or more command signals from a central controller which can control a parameter of the first light generated by the main projection light source;
an auxiliary light source,
a camera,
wherein the auxiliary light source can illuminate a projection surface; and
wherein the camera can capture an image of the projection surface as illuminated by the auxiliary light source.

12. The lighting device of claim 11 wherein
the auxiliary light source can be controlled by one or more command signals from the central controller received by the communications port.

13. The lighting device of claim 12 wherein
the auxiliary light source can be controlled by one or more command signals from the central controller to be on or off.

14. The lighting device of claim 12 wherein
the auxiliary light source can be controlled by one or more command signals from the central controller to produce a modulated infrared control signal.

15. The lighting device of claim 14 further comprising
an infrared light cut filter;
wherein the camera has an optical path;
and wherein the infrared light cut filter can be controlled to be placed in or out of the camera optical path by one or more command signals received from the central controller by the communications port.

16. The lighting device of claim 14 further comprising
a visible light cut filter;
wherein the camera has an optical path;
and wherein the visible light cut filter can be controlled to be placed in or out of the camera optical path by one or more command signals received from the central controller by the communications port.

17. A lighting device comprising:
a lamp housing;
a light valve which is located inside the lamp housing;
a main projection light source which is located inside the lamp housing;
a communications port capable of receiving an address signal for selecting the lighting device and the communications port capable of receiving one or more command signals from a central controller which can control a parameter of the main projection light source,
a camera which has an optical path;
an infrared cut filter;
wherein the camera is capable of capturing visible light images and infrared light images;
wherein the infrared cut filter can be controlled to be placed in or out of the camera optical path by one or more command signals from the central controller received by the communications port.

18. A lighting device comprising:
a main projection light source;
a light valve;
a lamp housing in which is located the main projection light source and the light valve;
a communications port capable of receiving from a central controller one or more address signals for selecting the lighting device, and one or more command signals for controlling a parameter of the main projection light source;
a camera having an optical path;
a visible light cut filter;
wherein the camera is capable of capturing visible light images and infrared light images; and
wherein the visible light cut filter can be controlled to be placed in or out of the camera optical path by one or more command signals received by the communication port from the central controller.

19. A lighting device comprising:
a main projection light source;
a light valve;
a lamp housing in which is located the main projection light source and the light valve;
a communications port capable of receiving from a central controller one or more address signals for selecting the lighting device, and one or more command signals for controlling a parameter of the main projection light source; and
a camera;
wherein the camera captures infrared monochrome images; and
wherein the lighting device colorizes the infrared monochrome images so that different intensities of the monochrome images are associated with different levels of red, green or blue and where the colorization of the monochrome images are controlled to be associated or not associated by one or more command signals received by the communications port from the central controller.

20. The lighting device of claim 19 further comprising
an auxiliary light source which emits infrared light.

21. The lighting device of claim 19 further comprising
a visible light cut filter; and
wherein the camera has an optical path;
and wherein the visible light cut filter is controlled to be placed in or out of the camera optical path by one or more command signals received by the communications port from the central controller.

22. The lighting device of claim 19 further comprising
An infrared light cut filter;
wherein the camera has an optical path;
and wherein the infrared light cut filter can be controlled to be placed in or out of the camera optical path by one or more command signals received by the communications port from the central controller.

23. A lighting device comprising
a main projection light source having an optical path;
a light valve;
a lamp housing in which is located the main projection light source and the light valve;
a communications port capable of receiving from a central controller one or more address signals for selecting the lighting device, and one or more command signals for controlling a parameter of the main projection light source; and
a camera;
a hot mirror located in the optical path of the main projection light source; and
wherein the hot mirror can be controlled to be placed in or out of the optical path of the main projection light source by one or more command signals received by the communications port from the central controller.

24. A lighting device comprising
a main projection light source having an optical path;
a light valve;
a lamp housing in which is located the main projection light source and the light valve;
a communications port capable of receiving from a central controller one or more address signals for selecting the lighting device, and one or more command signals for controlling a parameter of the main projection light source; and
a camera;
a visible light cut filter located in the optical path of the main projection light source; and
wherein the visible light cut filter can be controlled to be placed in or out of the optical path of the main projection light source by one or more command signals received by the communication port from the central controller.

25. A lighting device comprising:
a main projection light source having an optical path;
a light valve;
a lamp housing in which is located the main projection light source and the light valve;
a communications port capable of receiving from a central controller one or more address signals for selecting the lighting device;
an auxiliary light source;
wherein the auxiliary light source generates and projects an infrared control signal and the infrared control signal is used to control a device that is external to the lighting device; and wherein the infrared control signal is a modulated infrared control signal.

26. A first lighting device comprising:
a main projection light source having an optical path;
a light valve;
a lamp housing in which is located the main projection light source and the light valve;
a communications port capable of receiving from a central controller one or more address signals for selecting the lighting device, and one or more command signals for controlling a parameter of the main projection light source; and
an auxiliary light source;
wherein the auxiliary light source generates and projects a modulated infrared control signal that provides control instructions to a second lighting device.

27. A method comprising the steps of
locating an auxiliary light source and a camera within a lamp housing of a lighting device;
locating a main projection light source within the lamp housing of the lighting device;
locating a light value within the lamp housing of the lighting device; directing a first light from the main projection light source to the light valve
receiving an address signal which selects the lighting device;
receiving one or more command signals from a central controller which can control a parameter of the first light of the main projection light source;
illuminating a projection surface with the auxiliary light source; and
capturing an image of the projection surface with a camera as illuminated by the auxiliary light source.

28. The method of claim 27 further comprising
controlling the auxiliary light source by one or more command signals received from the central controller.

29. The method of claim 28 further comprising
controlling the auxiliary light source to be on or off by one or more command signals from the central controller.

30. The method of claim 27 further comprising
controlling the auxiliary light source by one or more command signals from the central controller to produce a modulated infrared control signal.

31. The method of claim 27 further comprising
controlling an infrared cut filter to be placed in or out of an optical path of the camera by one or more command signals from the central controller.

32. The method of claim 28 further comprising
controlling an infrared cut filter to be placed in or out of an optical path of the camera by one or more command signals from the central controller.

33. A method comprising the steps of
directing a first light from a main projection light source to a light valve of a lighting device, wherein the main projection light source and the light valve are located in a lamp housing;
receiving an address signal which selects the lighting device;
receiving one or more command signals from a central controller which can control a parameter of the first light of the main projection light source; and
controlling a hot mirror to be placed in or out of an optical path of the main projection light source by one or more command signals received from the central controller.

34. A method comprising the steps of
directing a first light from a main projection light source to a light valve of a lighting device, wherein the main projection light source and the light valve are located in a lamp housing;
receiving an address signal which selects the lighting device;
receiving one or more command signals from a central controller which can control a parameter of the first light of the main projection light source;
generating and projecting an infrared control signal from an auxiliary light source to control a device that is external to the lighting device.

35. The method of claim 34 wherein
the infrared control signal is a modulated infrared control signal.

36. A method comprising the steps of
projecting infrared light images created by a light valve from a lighting device using a visible light cut filter;
wherein the lighting device has a main projection light source which has an optical path; and
wherein the visible light cut filter is placed in the optical path of the main projection light source to allow only infrared images to be projected from the main projection light source.

37. The apparatus of claim 5 further comprising
a second lighting device;
a central controller which communicates with the first and second lighting device;
wherein the second lighting device is comprised of:
a main projection light source
a light valve;
an output lens;
a camera;
an auxiliary light source;
wherein a third light can be directed from the main projection light source of the second lighting device, to the light valve and through the output lens of the second lighting device onto a second projection surface;
wherein a fourth light can be projected from the auxiliary light source onto the second projection surface; and
wherein the camera of the second lighting device captures an image on the second projection surface wherein the image is illuminated by the fourth light.

38. A lighting apparatus comprising:
a lamp housing including a light valve and a main projection lamp;
a communications port for receiving address and command signals from a central controller; and
a camera;
wherein the main projection lamp has an optical path
whereing a projection field is established by the main projection lamp optical path;
wherein the camera has an optical path
whereing a camera field is established by the camera optical path; and
wherein the camera field is remotely positioned in relation to the projection field by one or more command signals received by the communication port.

39. The lighting apparatus of claim 38 wherein
the camera field is remotely positioned to be substantially aligned with the projection field on a projection surface.

40. The lighting apparatus of claim 38 wherein
the camera field is remotely positioned to substantially deviate the camera field away from the projection field on a projection surface.

41. A lighting apparatus comprising:

a lamp housing including a light valve, a lens and a main projection lamp, the main projection lamp having an optical path, wherein the projection lamp optical path establishes a projection field;

a communications port for receiving address and command signals from a central controller; and a camera having an optical path wherein the camera optical path establishes a camera field;

wherein the lens is remotely positioned by one or more command signals received by the communication port; and wherein the camera field is remotely positioned in relation to the projection field by referencing the lens wherein referencing the lens includes moving the lens an incremental value.

42. A lighting apparatus comprising:

a lamp housing including a light valve, a lens and a main projection lamp, the main projection lamp having an optical path, wherein the projection lamp optical path establishes a projection field;

a communications port for receiving address and command signals from a central controller; and a camera having an optical path wherein the camera optical path establishes a camera field;

wherein the lens is remotely positioned by one or more command signals received by the communication port; and wherein the camera field is remotely positioned in relation to the projection field by referencing the lens includes moving the lens a distance value from the light valve to the lens.

43. A lighting apparatus comprising:

a lamp housing including a light valve and a main projection lamp;

a communications port for receiving address and command signals from a central controller; and a camera;

wherein the main projection lamp has an optical path wherein the main projection lamp optical path establishes a projection field;

wherein the camera has an optical path wherein the camera optical path establishes a camera field further comprising means for remotely positioning the camera field in relation to the projection field by one or more command signals received by the communication port.

* * * * *